United States Patent
Mital et al.

(10) Patent No.: US 9,747,140 B2
(45) Date of Patent: Aug. 29, 2017

(54) DISTRIBUTED APPLICATION INTERFACING ACROSS DIFFERENT HARDWARE

(71) Applicant: Microsoft Technology Licensing, LLC, Redmond, WA (US)

(72) Inventors: Vijay Mital, Kirkland, WA (US); Robin Abraham, Redmond, WA (US); Suraj T. Poozhiyil, Redmond, WA (US); Nizam Anuar, Snoqualmie, WA (US); Bao Quoc Nguyen, Bellevue, WA (US); Henry Hun-Li Reid Pan, Sammamish, WA (US); Darryl E. Rubin, Ellensburg, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/791,153

(22) Filed: Jul. 2, 2015

(65) Prior Publication Data

US 2017/0004021 A1    Jan. 5, 2017

(51) Int. Cl.
G06F 3/00         (2006.01)
G06F 9/54         (2006.01)

(52) U.S. Cl.
CPC ............... G06F 9/541 (2013.01); G06F 9/54 (2013.01); G06F 9/543 (2013.01)

(58) Field of Classification Search
CPC ........................................................ G06F 9/54
USPC ....................................................... 719/310
See application file for complete search history.

(56) References Cited

U.S. PATENT DOCUMENTS

| 5,596,702 A | 1/1997 | Stucka et al. |
| 5,632,034 A | 5/1997 | O'Farrell |
| 5,884,083 A | 3/1999 | Royce |
| 6,005,548 A | 12/1999 | Latypov et al. |

(Continued)

FOREIGN PATENT DOCUMENTS

| DE | 102012110802 | 11/2013 |
| EP | 0475581 | 3/1992 |

(Continued)

OTHER PUBLICATIONS

Sascha Hunold, Transformation of Legacy Software into Client/Server Applications through Pattern-based Rearchitecturing, 2008.*

(Continued)

*Primary Examiner* — Lechi Truong
(74) *Attorney, Agent, or Firm* — Workman Nydegger

(57) ABSTRACT

Mechanisms for a presentation module to perform distributed interfacing with an application across a plurality of hardware entities. The module identifies the hardware entities that are available to interface with endpoints of an application. The presentation module performs distribution of assignment of hardware entities to interact with the endpoints by, for each of at least some of the hardware entities, determining a subset of endpoints with which the corresponding hardware entities is to interface. Furthermore, the application is operated in that state to thereby detect interaction of at least some of the hardware entities with the application via at least some of the endpoints. Thus, distributed interfacing of hardware entities with an application is facilitated.

18 Claims, 22 Drawing Sheets

(56) References Cited

U.S. PATENT DOCUMENTS

| | | | |
|---|---|---|---|
| 6,009,410 A | 12/1999 | LeMole et al. | |
| 6,061,644 A | 5/2000 | Leis | |
| 6,351,843 B1 | 2/2002 | Berkley et al. | |
| 6,442,476 B1 | 8/2002 | Poropat | |
| 6,536,037 B1 | 3/2003 | Guheen et al. | |
| 6,662,199 B1 | 12/2003 | Flight et al. | |
| 6,708,329 B1 | 3/2004 | Whitehill et al. | |
| 6,820,135 B1 | 11/2004 | Dingman et al. | |
| 6,917,963 B1 | 7/2005 | Hipp et al. | |
| 6,950,850 B1 | 9/2005 | Leff et al. | |
| 6,988,271 B2 | 1/2006 | Hunt | |
| 6,993,751 B2 | 1/2006 | Bhansali | |
| 7,047,518 B2 | 5/2006 | Little et al. | |
| 7,082,576 B2 | 7/2006 | Shahine et al. | |
| 7,171,655 B2 | 1/2007 | Gordon et al. | |
| 7,251,778 B1 | 7/2007 | Hill et al. | |
| 7,269,794 B2 | 9/2007 | Martinez et al. | |
| 7,275,241 B2 | 9/2007 | Choi | |
| 7,417,644 B2 | 8/2008 | Cooper et al. | |
| 7,433,956 B2 | 10/2008 | Zhao et al. | |
| 7,458,029 B2 | 11/2008 | Agrawala et al. | |
| 7,506,324 B2 | 3/2009 | Thiagarajan et al. | |
| 7,509,374 B2 | 3/2009 | Trinh et al. | |
| 7,519,959 B1 | 4/2009 | Dmitriev | |
| 7,536,635 B2 | 5/2009 | Racovolis et al. | |
| 7,539,982 B2 | 5/2009 | Stuart | |
| 7,543,269 B2 | 6/2009 | Krueger et al. | |
| 7,552,428 B2 | 6/2009 | Stoodley et al. | |
| 7,558,748 B2 | 7/2009 | Ehring et al. | |
| 7,664,813 B2 | 2/2010 | Pettit et al. | |
| 7,698,430 B2 | 4/2010 | Jackson | |
| 7,702,729 B2 | 4/2010 | Johanson et al. | |
| 7,721,223 B2 | 5/2010 | Ben-Shachar et al. | |
| 7,730,446 B2 | 6/2010 | Anonsen | |
| 7,765,470 B2 | 7/2010 | Epstein | |
| 7,779,429 B2 | 8/2010 | Neil et al. | |
| 7,814,171 B2 | 10/2010 | Blegen et al. | |
| 7,818,729 B1 | 10/2010 | Plum et al. | |
| 7,853,938 B2* | 12/2010 | Melhem | G06F 17/2247 717/152 |
| 7,908,594 B2 | 3/2011 | Varanasi et al. | |
| 7,917,534 B2 | 3/2011 | Demiroski et al. | |
| 7,926,029 B1 | 4/2011 | Stoyen | |
| 7,930,432 B2 | 4/2011 | Blaszczak | |
| 7,937,685 B2 | 5/2011 | Weil et al. | |
| 7,954,084 B2 | 5/2011 | Arcaro et al. | |
| 7,984,426 B2 | 7/2011 | Loff | |
| 7,991,916 B2 | 8/2011 | Meek et al. | |
| 8,014,308 B2 | 9/2011 | Gates et al. | |
| 8,019,770 B1 | 9/2011 | Hartsook et al. | |
| 8,036,140 B2 | 10/2011 | Rao et al. | |
| 8,042,094 B2 | 10/2011 | Napoli | |
| 8,060,544 B2 | 11/2011 | Werner et al. | |
| 8,060,553 B2 | 11/2011 | Mamou et al. | |
| 8,060,857 B2 | 11/2011 | Biggerstaff | |
| 8,079,023 B2 | 12/2011 | Chen | |
| 8,082,517 B2 | 12/2011 | Ben-Shachar et al. | |
| 8,085,281 B2 | 12/2011 | Hines et al. | |
| 8,161,463 B2 | 4/2012 | Johnson et al. | |
| 8,171,398 B2 | 5/2012 | Hosotsubo | |
| 8,191,080 B2 | 5/2012 | Goring et al. | |
| 8,209,674 B2 | 6/2012 | Meijer et al. | |
| 8,214,768 B2 | 7/2012 | Boule et al. | |
| 8,214,799 B2 | 7/2012 | Haselden | |
| 8,233,887 B2 | 7/2012 | Whitney et al. | |
| 8,253,649 B2 | 8/2012 | Imai et al. | |
| 8,255,156 B2 | 8/2012 | Ravenscroft et al. | |
| 8,255,889 B2 | 8/2012 | Stefansson et al. | |
| 8,332,828 B2 | 12/2012 | Vargas | |
| 8,365,156 B2 | 1/2013 | Sollich | |
| 8,402,379 B2 | 3/2013 | Barak | |
| 8,407,605 B2 | 3/2013 | Go et al. | |
| 8,438,533 B2 | 5/2013 | Fritzsche et al. | |
| 8,456,654 B2 | 6/2013 | Kelly et al. | |
| 8,464,208 B2 | 6/2013 | Feigen | |
| 8,464,337 B2 | 6/2013 | Mathew et al. | |
| 8,479,202 B2 | 7/2013 | Hogan et al. | |
| 8,489,474 B2 | 7/2013 | Crook et al. | |
| 8,495,580 B2 | 7/2013 | Gowri | |
| 8,505,002 B2 | 8/2013 | Yehia et al. | |
| 8,516,454 B2 | 8/2013 | Mizrachi et al. | |
| 8,527,970 B1 | 9/2013 | Luecke | |
| 8,528,000 B2 | 9/2013 | Schumacher et al. | |
| 8,531,451 B2 | 9/2013 | Mital et al. | |
| 8,533,661 B2 | 9/2013 | Nucci et al. | |
| 8,583,413 B2* | 11/2013 | Elaasar | G06F 8/38 703/22 |
| 8,600,446 B2 | 12/2013 | Chiang et al. | |
| 8,607,206 B2 | 12/2013 | Freeman et al. | |
| 8,615,551 B2 | 12/2013 | Balandin et al. | |
| 8,635,521 B2 | 1/2014 | Fleishman et al. | |
| 8,635,537 B1 | 1/2014 | Kan et al. | |
| 8,650,384 B2 | 2/2014 | Lee et al. | |
| 8,654,952 B2 | 2/2014 | Wang et al. | |
| 8,667,130 B2 | 3/2014 | Shuster | |
| 8,669,939 B2 | 3/2014 | Underkoffler et al. | |
| 8,689,191 B2 | 4/2014 | Dolby | |
| 8,707,278 B2 | 4/2014 | Balakrishnan et al. | |
| 8,707,287 B2 | 4/2014 | Gregersen et al. | |
| 8,779,971 B2 | 7/2014 | Wellington | |
| 8,786,517 B2 | 7/2014 | Lewin et al. | |
| 8,812,601 B2 | 8/2014 | Hsieh et al. | |
| 8,832,676 B2 | 9/2014 | Mahajan et al. | |
| 8,850,045 B2 | 9/2014 | Berg et al. | |
| 8,892,850 B2 | 11/2014 | Archer et al. | |
| 8,914,733 B2 | 12/2014 | Chai et al. | |
| 8,928,582 B2 | 1/2015 | Senanayake et al. | |
| 8,954,229 B2 | 2/2015 | Park | |
| 8,965,349 B2 | 2/2015 | Kieft et al. | |
| 8,990,779 B2 | 3/2015 | Schalk | |
| 9,003,010 B1 | 4/2015 | Saparoff | |
| 9,003,298 B2 | 4/2015 | Hoke et al. | |
| 9,015,659 B2 | 4/2015 | Gregersen | |
| 9,032,377 B2 | 5/2015 | Mizrachi et al. | |
| 9,396,698 B2 | 7/2016 | Mital et al. | |
| 9,424,309 B2 | 8/2016 | Ramachandra et al. | |
| 2002/0165993 A1 | 11/2002 | Kramer | |
| 2002/0169851 A1 | 11/2002 | Weathersby et al. | |
| 2003/0229685 A1 | 12/2003 | Twidale et al. | |
| 2004/0078760 A1 | 4/2004 | Melhem et al. | |
| 2004/0216096 A1 | 10/2004 | Messer et al. | |
| 2005/0041784 A1 | 2/2005 | Timmins et al. | |
| 2005/0132045 A1 | 6/2005 | Hornback et al. | |
| 2005/0138151 A1 | 6/2005 | Lam et al. | |
| 2005/0177676 A1 | 8/2005 | Karatal et al. | |
| 2005/0251339 A1 | 11/2005 | Araki et al. | |
| 2006/0031779 A1 | 2/2006 | Theurer et al. | |
| 2006/0089990 A1 | 4/2006 | Ng et al. | |
| 2006/0239234 A1 | 10/2006 | Rao et al. | |
| 2007/0011008 A1 | 1/2007 | Scarano et al. | |
| 2007/0038929 A1 | 2/2007 | Miyazawa | |
| 2007/0067440 A1 | 3/2007 | Bhogal et al. | |
| 2007/0078953 A1 | 4/2007 | Chai et al. | |
| 2007/0174291 A1 | 7/2007 | Cooper et al. | |
| 2007/0180362 A1 | 8/2007 | Hunt et al. | |
| 2007/0271332 A1 | 11/2007 | Joshi et al. | |
| 2007/0288850 A1 | 12/2007 | Fletcher et al. | |
| 2007/0294626 A1 | 12/2007 | Fletcher et al. | |
| 2008/0072211 A1 | 3/2008 | Rothman et al. | |
| 2009/0094544 A1 | 4/2009 | Savage | |
| 2009/0100178 A1* | 4/2009 | Gonzales | G06F 9/50 709/226 |
| 2009/0267780 A1 | 10/2009 | Van Hoff et al. | |
| 2010/0058205 A1 | 3/2010 | Vakil et al. | |
| 2010/0083212 A1 | 4/2010 | Fritzsche et al. | |
| 2010/0131868 A1 | 5/2010 | Chawla et al. | |
| 2010/0246571 A1 | 9/2010 | Geppert et al. | |
| 2010/0251031 A1 | 9/2010 | Nieh et al. | |
| 2010/0306670 A1 | 12/2010 | Quinn et al. | |
| 2010/0306738 A1 | 12/2010 | Verma et al. | |
| 2010/0312817 A1 | 12/2010 | Steakley | |
| 2011/0055309 A1 | 3/2011 | Gibor et al. | |
| 2011/0078103 A1 | 3/2011 | Teng et al. | |
| 2011/0078560 A1 | 3/2011 | Weeldreyer et al. | |

(56) References Cited

U.S. PATENT DOCUMENTS

| | | |
|---|---|---|
| 2011/0099496 A1 | 4/2011 | Baek et al. |
| 2011/0119576 A1 | 5/2011 | Aumann |
| 2011/0119603 A1 | 5/2011 | Peltz et al. |
| 2011/0154209 A1 | 6/2011 | Fan et al. |
| 2011/0197124 A1 | 8/2011 | Garaventa |
| 2011/0202909 A1 | 8/2011 | Meijer et al. |
| 2011/0228922 A1 | 9/2011 | Dhara et al. |
| 2011/0265003 A1 | 10/2011 | Schubert et al. |
| 2011/0289455 A1 | 11/2011 | Reville et al. |
| 2012/0030632 A1 | 2/2012 | McRae et al. |
| 2012/0110009 A1 | 5/2012 | Kraft et al. |
| 2012/0144288 A1 | 6/2012 | Caruso et al. |
| 2012/0159472 A1 | 6/2012 | Hong et al. |
| 2012/0185100 A1 | 7/2012 | Strohbach et al. |
| 2012/0197728 A1 | 8/2012 | Luna et al. |
| 2012/0204180 A1 | 8/2012 | Santoli et al. |
| 2013/0047079 A1 | 2/2013 | Kroeger et al. |
| 2013/0055113 A1 | 2/2013 | Chazin et al. |
| 2013/0111360 A1 | 5/2013 | Kodama et al. |
| 2013/0117715 A1 | 5/2013 | Williams et al. |
| 2013/0178970 A1 | 7/2013 | Cachapa et al. |
| 2013/0212487 A1 | 8/2013 | Cote |
| 2013/0212504 A1 | 8/2013 | Zalewski et al. |
| 2013/0212703 A1 | 8/2013 | Ramesh et al. |
| 2013/0219263 A1 | 8/2013 | Abrahami |
| 2013/0219303 A1 | 8/2013 | Eriksson et al. |
| 2013/0282532 A1 | 10/2013 | Shihadah et al. |
| 2013/0297696 A1 | 11/2013 | Alexandrov et al. |
| 2013/0311327 A1 | 11/2013 | Tehrani et al. |
| 2014/0007103 A1 | 1/2014 | Nachum et al. |
| 2014/0089888 A1 | 3/2014 | Bhaskara et al. |
| 2014/0096110 A1 | 4/2014 | Charters et al. |
| 2014/0181800 A1 | 6/2014 | Johansson et al. |
| 2014/0201155 A1 | 7/2014 | Vijayan et al. |
| 2014/0215356 A1 | 7/2014 | Brander et al. |
| 2014/0218343 A1 | 8/2014 | Hicks et al. |
| 2014/0223281 A1 | 8/2014 | Bocanegra |
| 2014/0229858 A1 | 8/2014 | Bleker et al. |
| 2014/0245140 A1 | 8/2014 | Brown et al. |
| 2014/0250193 A1 | 9/2014 | Goncalves et al. |
| 2014/0280580 A1 | 9/2014 | Langlois et al. |
| 2014/0282106 A1 | 9/2014 | Smith et al. |
| 2014/0289640 A1 | 9/2014 | Poornachandran et al. |
| 2014/0304594 A1 | 10/2014 | Pittenger et al. |
| 2014/0304663 A1 | 10/2014 | Mishra |
| 2014/0304718 A1 | 10/2014 | Gambardella et al. |
| 2014/0306964 A1 | 10/2014 | Reddish et al. |
| 2014/0310619 A1 | 10/2014 | Fickenwirth et al. |
| 2014/0310697 A1 | 10/2014 | Reddish et al. |
| 2014/0359478 A1 | 12/2014 | Thakur et al. |
| 2015/0036848 A1 | 2/2015 | Donaldson |
| 2015/0067536 A1 | 3/2015 | Leorin et al. |
| 2015/0070263 A1 | 3/2015 | Murillo et al. |
| 2015/0081684 A1 | 3/2015 | Lewis |
| 2015/0261543 A1* | 9/2015 | Lahteenmaki .... G06F 15/17337 712/225 |
| 2015/0363581 A1 | 12/2015 | Ranadive et al. |
| 2016/0094429 A1 | 3/2016 | Richards et al. |
| 2017/0003862 A1 | 1/2017 | Mital et al. |
| 2017/0003940 A1 | 1/2017 | Mital et al. |
| 2017/0003943 A1 | 1/2017 | Mital et al. |
| 2017/0003944 A1 | 1/2017 | Mital et al. |
| 2017/0004022 A1 | 1/2017 | Mital et al. |
| 2017/0004116 A1 | 1/2017 | Mital et al. |
| 2017/0005897 A1 | 1/2017 | Mital et al. |
| 2017/0005970 A1 | 1/2017 | Mital et al. |
| 2017/0010590 A1 | 1/2017 | Mital et al. |
| 2017/0010673 A1 | 1/2017 | Mital et al. |
| 2017/0010758 A1 | 1/2017 | Mital et al. |
| 2017/0010789 A1 | 1/2017 | Mital et al. |
| 2017/0011011 A1 | 1/2017 | Mital et al. |

FOREIGN PATENT DOCUMENTS

| | | |
|---|---|---|
| EP | 1677239 | 7/2006 |
| EP | 2592506 | 5/2013 |
| WO | WO 2004013784 | 2/2004 |
| WO | WO 2008135459 | 11/2008 |
| WO | 2013097896 | 7/2013 |
| WO | 2013182159 | 12/2013 |
| WO | 2014032089 A1 | 3/2014 |
| WO | 2014158128 A1 | 10/2014 |

OTHER PUBLICATIONS

Bergstein, "Object-Preserving Class Transformations", ACM, pp. 299-313, 1991.

McGachey et al. "Classifying Java Class Transformations for Pervasive Virtualized Access", ACM, pp. 75-84, 2009.

International Search Report and Written Opinion for PCT/US2016/041211 mailed Sep. 13, 2016.

Office Action dated Aug. 26, 2016 cited in U.S. Appl. No. 14/791,143.

Office Action dated Aug. 29, 2016 cited in U.S. Appl. No. 14/791,141.

International Search Report and Written Opinion for PCT/US2016/041212 mailed Sep. 19, 2016.

International Search Report and Written Opinion for PCT/US2016/040234 mailed Sep. 14, 2016.

International Search Report and Written Opinion for PCT/US2016/040233 mailed Sep. 22, 2016.

Bhardwaj et al. "ECC: Edge Cloud Composites" 2014 2nd IEEE International Conference on Mobile Cloud computing, Services, and Engineering, IEEE, Apr. 8, 2014, pp. 38-47.

Fujii et al. "Semantics-Based Context-Aware Dynamic Service Composition" ACM Transactions on Autonomous Adoptive System, vol. 4, No. 2, May 1, 2009.

Pering et al. "Enabling Pervasive Collaboration with Platform Composition" May 11, 2009, Pervasive Computing, Spimger Berlin Heidelberg, pp. 184-201.

International Search Report and Written Opinion for PCT/US2016/040232 mailed Sep. 20, 2016.

Troche "Refactoring with Eclipse: Eclipse Provides a Collection of Refactoring Features" Oct. 1, 2004.

International Search Report and Written Opinion for PCT/US2016/040231 mailed Sep. 23, 2016.

International Search Report and Written Opinion for PCT/US2016/040238 mailed Sep. 28, 2016.

International Search Report and Written Opinion for PCT/US2016/041213 mailed Oct. 11, 2016.

International Search Report and Written Opinion for PCT/US2016/040235 mailed Oct. 10, 2016.

International Search Report and Written Opinion for PCT/US2016/041214 mailed Oct. 12, 2016.

International Search Report and Written Opinion for PCT/US2016/040595 mailed Oct. 13, 2016.

International Search Report and Written Opinion for PCT/US2016/040239 mailed Oct. 7, 2016.

International Search Report and Written Opinion for PCT/US2016/040240 mailed Oct. 13, 2016.

Korkhov et al. "VLAM-G: Interactive Data Driven Workflow Engine for Grid-Enabled Resources", Scientific Programming, vol. 15, No. 3, Jan. 2007.

Lin et al. "Service-Oriented Architecture for VIEW: A Visual Scientific Workflow Management System", Services Computing, 2008.

Zhang et al. "CloudWF: A Computational Workflow System for Clouds Based on Hadoop" Dec. 2009, Cloud Computing, pp. 393-404.

Fei et al. "A Dataflow-Based Scientific Workflow Composition Framework" IEEE Transactions on Services Computing, vol. 5, No. 1, Jan. 2012.

U.S. Appl. No. 14/791,161, Oct. 17, 2016, Office Action.

International Search Report and Written Opinion for PCT/US2016/041215 dated Oct. 13, 2016.

(56) References Cited

OTHER PUBLICATIONS

Teamviewer "Manual TeamViewer 6.0—9947c" Dec. 1, 2010, retrieved Aug. 23, 2016, p. 50.
Nishizawa et al. "A Small Extension to Java for Class Refinement", ACM, pp. 160-165, 2008.
Etien et al. "Chaining Model Transformations", ACM, pp. 9-14, 2012.
Fuad et all. "Similarity Mapping of Software Faults for Self-Healing Applications", ACM, pp. 1-4, 2010.
Weidendorfer et al. "Performance Optimization by Dynamic Code Transformation", ACM, pp. 1-2, 2011.
U.S. Appl. No. 14/791,158, Dec. 2, 2016, Office Action.
U.S. Appl. No. 14/791,143, Dec. 23, 2016, Notice of Allowance.
Office Action dated Jan. 26, 2017 cited in U.S. Appl. No. 14/794,749.
"Second Written Opinion for PCT Application No. PCT/US2016/040233", Mailed Date: Jan. 11, 2017, 10 Pages.
Notice of Allowance dated Feb. 27, 2017 cited in U.S. Appl. No. 14/791,144.
Begel, Andrew, "CrystalBoard: A Transparent Shared Whiteboard", Retrieved on: Jul. 9, 2015 Available at: http://research.microsoft.com/en-us/um/people/abegel/cs294/cs294-paper.html.
Begole, et al., "Flexible Collaboration Transparency: Supporting Worker Independence in Replicated Application-Sharing Systems", In Journal of ACM Transactions on Computer-Human Interaction, vol. 6, Issue 2, Jun. 1999, pp. 95-132.
Datta, et al., "Proxy-Based Acceleration of Dynamically Generated Content on the World Wide Web: An Approach and Implementation", In Proceedings of ACM SIGMOD International Conference on Management of Data, Jun. 4, 2002, pp. 97-108.
Ai, et al., "Spatial Relation Abstract in Map Generalization Process", In Proceedings of the 9th ACM international symposium on advances in geographic information systems, Nov. 9, 2001, 11 pages.
Fritzsche, et al., "Model Transformation Chains in Model-Driven Performance Engineering: Experiences and Future Research Needs", In Proceedings of Modellierung, Mar. 24, 2010, pp. 213-220, 8 pages.
Fritzsche, et al., "Systematic Usage of Embedded Modelling Languages in Automated Model Transformation Chains", In Proceedings of First International Conference Software Language Engineering, Sep. 29, 2008, 4 pages.
Liu, et al., "UI Portals: Sharing Arbitrary Regions of User Interfaces on Traditional and Multi-User Interactive Devices", In Proceedings of 9th International Conference on Ubiquitous Intelligence & Computing and 9th International Conference on Autonomic & Trusted Computing, Sep. 4, 2012, pp. 957-962.
Markarian, et al., "Seamless Interaction Among Heterogeneous Devices in Support for Co-located Collaboration", In Proceedings of the 12th International Conference on Groupware: Design, Implementation, and use, Sep. 6, 2006, 16 pages.
Nimphius, et al., "Building Customizable Oracle ADF Business Applications with Oracle Metadata Services (MDS)", In Oracle White Paper, Jun. 2010, 57 pages.
Qaddoura, Fareed, "Dynamic Website and Data Engine Generators for Distributed Enterprise/Business Architectures", In Thesis, Dec. 2004, 84 pages.
Richa, et al., "Towards Testing Model Transformation Chains Using Precondition Construction in Algebraic Graph Transformation", In Proceedings of 17th International Conference on Model Driven Engineering Languages & Systems, Sep. 29, 2014, 10 pages.
Schlatter, Tania, "Designing Personalized, Dynamic web Applications with ATG", Published on: Oct. 21, 2002 Available at: http://www.nimblepartners.com/share/atg_design_process.pdf.
Schwabe, et al., "Cohesive Design of Personalized Web Applications", In Journal of IEEE Internet Computing, vol. 6, Issue 2, Mar. 2002, pp. 34-43.
Shi, et al., "Finger Gesture Interaction on Large Tabletop for Sharing Digital Documents Among Multiple Users", In Proceedings of First IEEE International Conference on Ubi-Media Computing, Jul. 31, 2008, pp. 8-13.
Shurtz, S. Richard, "Application Sharing from Mobile Devices with a Collaborative Shared Display", In Thesis and Dissertations Brigham Young University, Jun. 5, 2014, 106 pages.
Sripradha, et al., "Dynamic Resource Management Using Gesture-Based User Interface", In Proceedings of 20th Annual International Conference on Advanced Computing and Communications, Sep. 19, 2014, 6 pages.
Stille, et al., "A2DL—An Adaptive Automatic Display Layout System", In Proceedings of Third Annual Symposium Human on Interaction with Complex Systems, Aug. 25, 1996, pp. 243-250.
Stirbu, Vlad, "A RESTful Architecture for Adaptive and Multi-device Application Sharing", In Proceedings of First International Workshop on RESTful Design, Apr. 26, 2010, 4 pages.
Vanhooff, et al., "Towards a Transformation Chain Modeling Language", In Proceedings 6th International Workshop Embedded Computer Systems: Architectures, Modeling, and Simulation, Jul. 17, 2006, 10 pages.
Vanhooff, et al., "UniTI: A Unified Transformation Infrastructure", In Proceedings of 10th International Conference on Model Driven Engineering Languages and Systems, Sep. 30, 2007, 15 pages.
Wang, et al., "PLA-based Runtime Dynamism in Support of Privacy-Enhanced Web Personalization", In Proceedings of 10th International Software Product Line Conference, Aug. 21, 2006, 10 pages.
Yie, et al., "Realizing Model Transformation Chain Interoperability", In Journal Software and Systems Modeling, Feb. 1, 2012, 21 pages.
Zee, et al., "Application of geographical concepts and spatial technology to the Internet of Things", Retrieved on: Jul. 9, 2015 Available at: http://dspace.ubvu.vu.nl/bitstream/handle/1871/47951/2013-33.pdf?.
"Application Transformation", Published on: May 4, 2014, Available at: hp.com/us/en/business-solutions/application-transformation-overview.html.
"Configuring the Display of Portal Content", Published on: Jul. 6, 2013 Available at: https://help.sap.com/saphelp_nw73/helpdata/en/3f/4e286c29d3475ca4ebdaedac6f9ede/frameset.htm.
Deploying Multiple-Instance Applications, Retrieved on: Apr. 29, 2015, Availabale at: https://technet.microsoft.com/en-us/lilbrary/cc779351(v=ws.10).aspx.
"pexpect—Spawn child applications and control them automatically.", Published on: Oct. 21, 2013 Available at: bx.psu.edu/~nate/pexpect/pexpect.html.
Office action dated Feb. 28, 2017 cited in U.S. Appl. No. 14/791,151.
Notice of Allowance dated Apr. 20, 2017 cited in U.S. Appl. No. 14/791,143.
Feinerer et al, "Class Diagrams with Equated Association Chains", IEEE, pp. 209-216, 2013.
Yu et al., "A Feature-Driven Approach to Automated Class Diagram Construction", ACM, pp. 1-9, 2015.
Vignaga et al., "Transforming System Operations' Interactions into a Design Class Diagram", ACM, pp. 993, 997, 2007.
Magalhaes et al., "A Model Driven Transformation Development Process for Model to Model Transformation", ACM, pp. 3-12, 2016.
Notice of Allowance dated Apr. 25, 2017 cited in U.S. Appl. No. 14/791,141.
2nd Written Opinion issued in PCT Application No. PCT/US2016/040240 dated Apr. 20, 2017.
International Preliminary Report on Patentability issued in PCT Patent Application No. PCT/US2016/041211 dated May 15, 2017.
Dibon Pierre et al: "Ubiquitous Widgets: Designing Interactions Architecture for Adaptive Mobile Applications", Distributed Computing in Sensor Systems (DCOSS), May 20, 2013, pp. 331-336.
2nd Written Opinion issued in PCT Application No. PCT/US2016/040595 dated May 3, 2017.
2nd Written Opinion issued in PCT Application No. PCT/US2016/041215 dated Mar. 16, 2017.

(56) References Cited

OTHER PUBLICATIONS

2nd Written Opinion issued in PCT Application No. PCT/US2016/041212 dated Jun. 6, 2017.
Second Written Opinion Issued in PCT Application No. PCT/US2016/040231, dated May 22, 2017, 5 Pages.
"Second Written Opinion Issued in PCT Application No. PCT/US2016/041213", dated May 29, 2017, 5 Pages.
U.S. Appl. No. 14/791,158, Jun. 2, 2017, Office Action.

\* cited by examiner

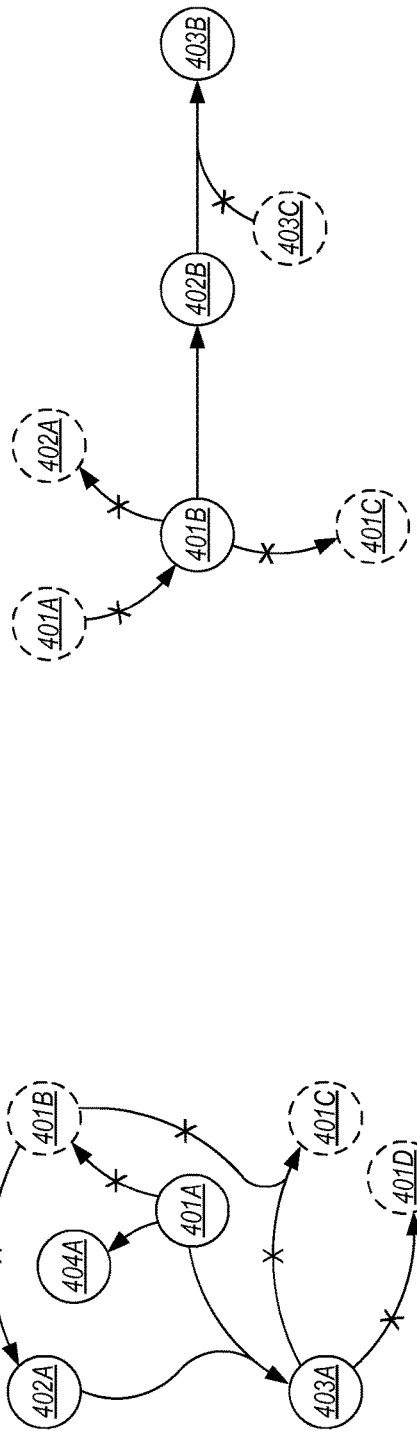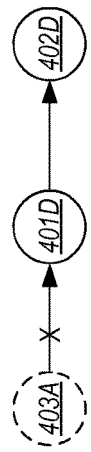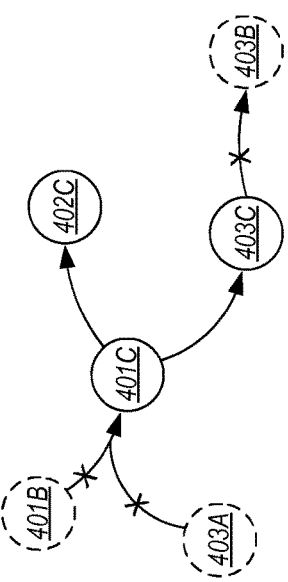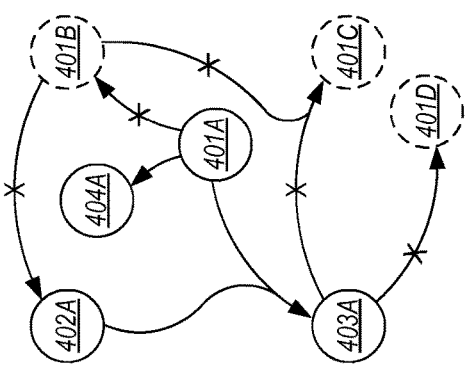
Figure 4A
Figure 4B
Figure 4C
Figure 4D

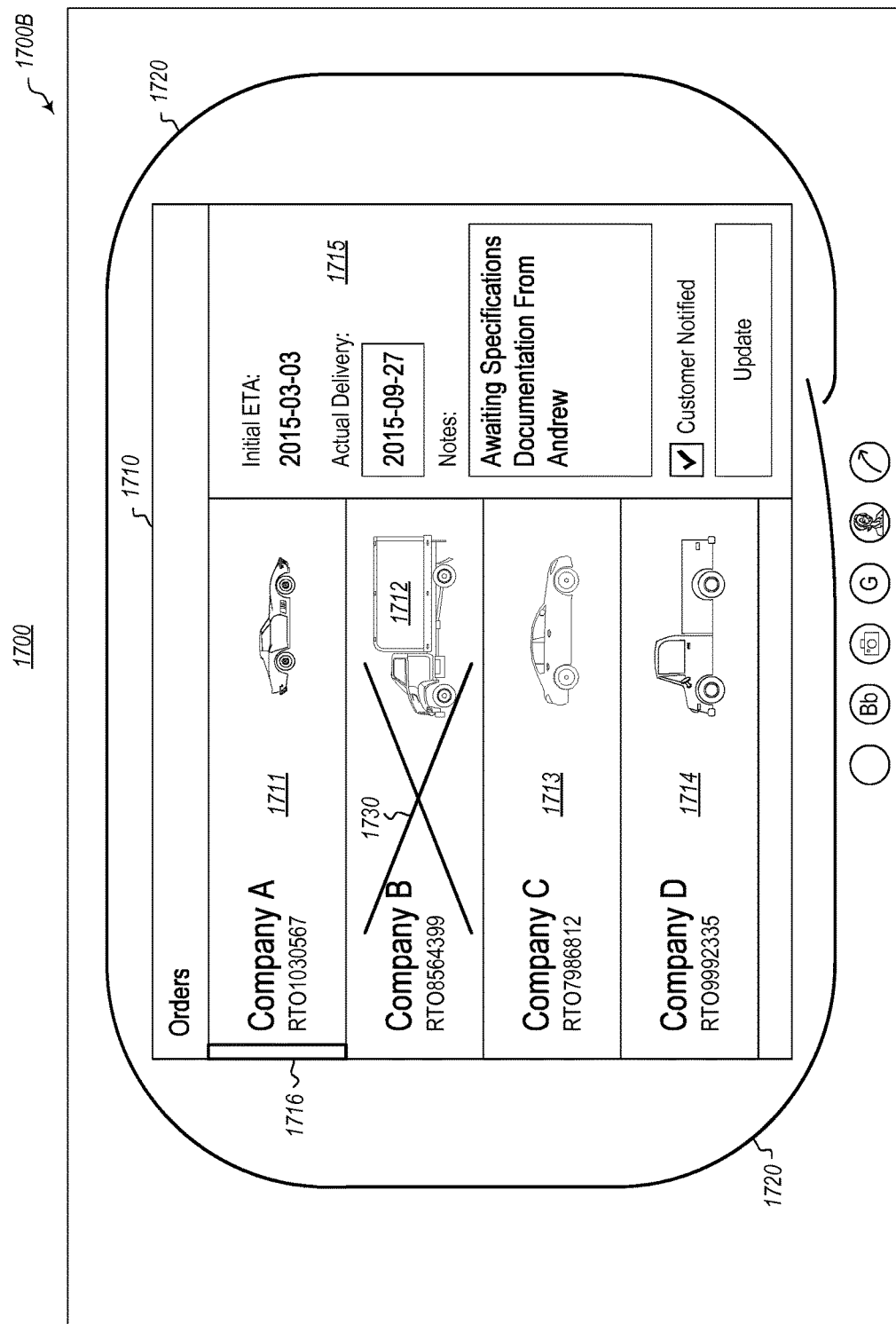

2100

2200

DISTRIBUTED APPLICATION INTERFACING ACROSS DIFFERENT HARDWARE

BACKGROUND

Computing technology has revolutionized the way we work, play, and communicate. Computing functional is obtained by a device or system executing software or firmware. The typical paradigm for application preparation is that the application is drafted well in advance of its use, and the functionality of the patent application is relatively predetermined.

There are some exceptions to the predetermined functionality. For instance, patches may be made to software application in order to provide repair of previously unknown bugs in the software. Furthermore, updates to software applications may be provided in order to add new functionality to the software application. In some cases, software may be configured and customized for a particular user. However, the application itself defines how far it can be customized. Users can also affect applications by providing commercial feedback on software performance. However, it can take years before user feedback is properly incorporated into an application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to mechanisms for a presentation module to perform distributed interfacing with an application across a plurality of hardware entities. The module identifies the hardware entities that are available to interface with endpoints of an application. The presentation module performs distribution of assignment of hardware entities to interact with the endpoints by, for each of at least some of the hardware entities, determining a subset of endpoints with which the corresponding hardware entities is to interface. Furthermore, the application is operated in that state to thereby detect interaction of at least some of the hardware entities with the application via at least some of the endpoints. Thus, distributed interfacing of hardware entities with an application is facilitated.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 4A through 4D each illustrate example transformation chains (arrows through which data does not flow absent joining with another transformation chain are illustrated with an "X", and dependency elements that are not nodes in the transformation chain itself are illustrated with dashed lined borders);

FIGS. 17A through 17C illustrate a sequence of user interfaces associated with the splitting of an application and redacting in order to perform the same;

DETAILED DESCRIPTION

At least some embodiments described herein relate to mechanisms for a presentation module to perform distributed interfacing with an application across a plurality of hardware entities. The module identifies the hardware entities that are available to interface with endpoints of an application. The presentation module performs distribution of assignment of hardware entities to interact with the endpoints by, for each of at least some of the hardware entities, determining a subset of endpoints with which the corresponding hardware entities is to interface. Furthermore, the application is operated in that state to thereby detect interaction of at least some of the hardware entities with the application via at least some of the endpoints. Thus, distributed interfacing of hardware entities with an application is facilitated.

First, the concept of transformation chains will be described with respect to FIGS. 1 through 8. Then, an architecture for supporting a universe of transformation chains and their operation will be described with respect to FIG. 9. Thereafter, an example operation of transformation chains will be described with respect to FIGS. 10 through 24. Because transformation chain-based applications represent a paradigm shift, this description will go into significant detail on potential operations of the transformation chain-based applications. Thereafter, an example computing system that may support aspects described herein will be described with respect to FIG. 25.

The Transformation Chain Application

The principles described herein operate using a transformation chain. A transformation chain is an interconnected set of nodes that each may represent data sources and/or data targets. There are links between the nodes, each link representing a transformation. For any given link, the associated transformation receives copies of values of one or more data sources situated at an input end to the link, and generates and provides resulting values at one or more data targets located at the output end of the link. For any given transformation, when a value at one or more of the data sources at its input end changes, the transformation is automatically reevaluated, potentially resulting in changes in value(s) of one or more data targets at the output end of the transformation.

In one embodiment, regardless of how complex the transformation chain is, the transformations may be constructed from declarative statements expressing equations, rules, constraints, simulations, or any other transformation type that may receive one or more values as input and provide resulting one or more values as output. An example of a transformation chain is a spreadsheet program, where any of the cells can be a data source or a data target. An equation (i.e., a transformation) may be associated with any cell to cause that cell to be a data target where results of the equation are placed.

Figure 1:
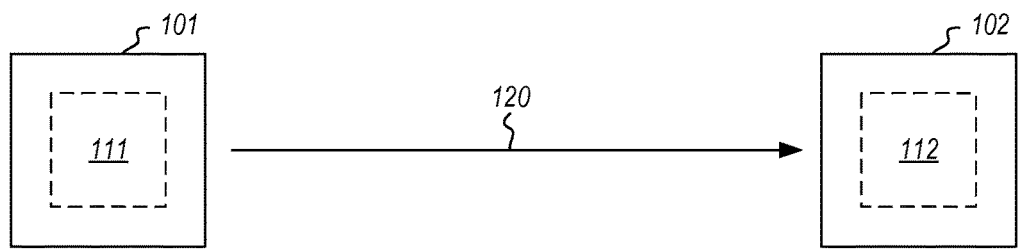
FIG. 1 abstractly illustrates a simple transformation chain in which there is but a single link coupling a single data source and a single data target and in which a transformation represented by the link is automatically performed using a value in the data source as input to generate a value in the data target.

As an example only, FIG. 1 illustrates a simple transformation chain 100 in which there is but a single link 120. In the drawing notation used throughout this description, a link will be illustrated as an arrow, with the input end being represented as the tail of the arrow, and the output end being represented as the head of the arrow. In cases in which there are multiple data sources at the input end of the link, the arrow will be represented with multiple tails. Copies of the values of the data source(s) at the tail(s) of the arrow represent input to the transformation. In cases in which there are multiple data targets affected by resulting value(s) of the transformation, the arrow will be represented with multiple heads. The values of the data target(s) at the head(s) of the arrow represent output from the transformation.

For instance, FIG. 1 illustrates a simple transformation chain 100 that includes a data source 101, a data target 102, and a single link 120. The link 120 represents a transformation performed on a copy of the value 111 at the data source 101 in order to generate a value 112 at the data target 102. Should the value 111 change, the transformation represented by link 120 is automatically reevaluated potentially resulting in a change in the value 112 in the data target 102.

Figure 2:
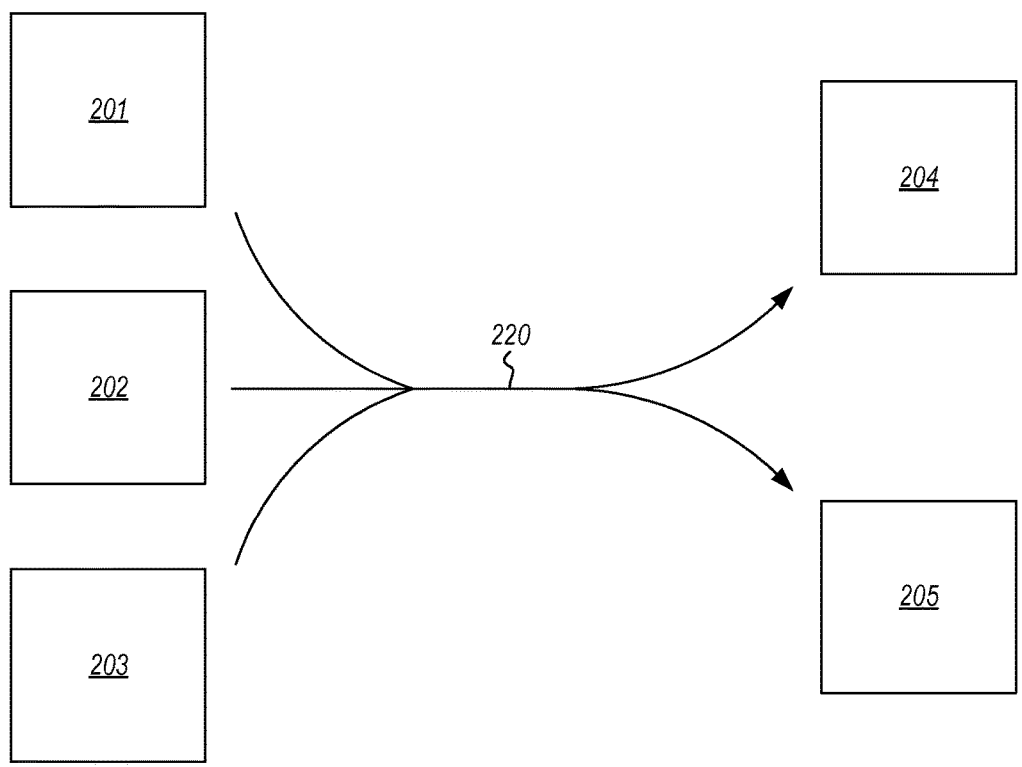
FIG. 2 abstractly illustrates another simple example transformation chain in which a transformation is performed using input values from three data sources in order to generate output values in two data targets.

FIG. 2 illustrates another simple example transformation chain 200 that includes three data sources 201, 202 and 203; two data targets 204 and 205, and a single link 220. The link 220 represents a transformation performed on copies of the values within the data sources 201, 202 and 203, in order to generate the values in the data targets 204 and 205. Should any of the values within the data sources 201, 202 or 203 change, the transformation link 220 is automatically reevaluated potentially resulting in a change in the values within any one or more of the data targets 204 and 205.

Figure 3:
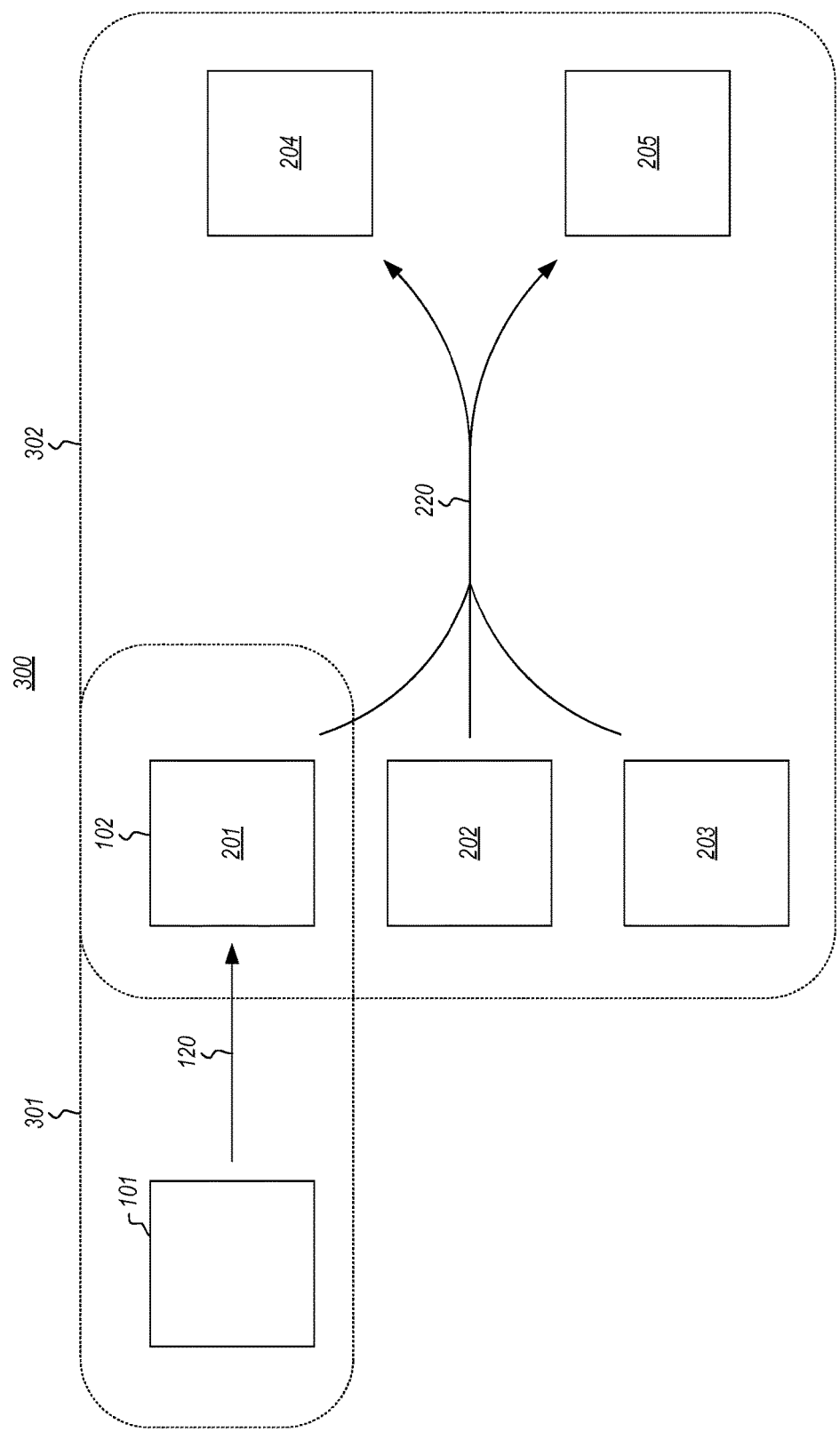
FIG. 3 illustrates a transformation chain in the form of a combination of the transformation chain of FIG. 1 and the transformation chain of FIG. 2.

FIG. 3 illustrates another example transformation chain 300, and illustrates the principle that transformation chains may build on each other in which a data source to one link may be a data target in other link, in order to create even more complicated transformation chains. For instance, the transformation chain 300 includes an instance 301 of the transformation chain 100, and an instance of 302 of the transformation chain 200. In this case, the data target 102 of the link 120 is also a data source 201 of the link 220. Should the value with the data source 101 change, the transformation represented by link 120 is reevaluated potentially resulting in a change in the value in the data target 102, which is likewise a data source 201 for the next link 220. Likewise, a change in a value of data source 201 would result in the transformation link 220 being reevaluated potentially resulting in a change in the values within any one or more of the data targets 204 and 205. Thus, a change in the value at data source 101 has the potential, through transformation reevaluation, to affect value(s) at node 102 (201) and at nodes 204 and 205. Data targets 204 and 205 might likewise represent data sources for yet other links. Accordingly, in complex transformation chains, a value change might cause propagated value changes through multiple nodes in a transformation chain through proper automated reevaluation of transformations within the transformation chain.

While the example transformation chain 300 includes just two links, transformation chains may be quite complex and involve enumerable nodes and associated links connecting those enumerable nodes. The principles described herein may operate regardless of the complexity of the transformation chains.

FIG. 4A through 4D illustrates example transformation chains instances or classes 400A through 400D. The instances will have the same structure as the classes, and so the illustrated forms may be considered to represent transformation classes as well as transformation instances. Instances will, however, have particular instance state associated with each of one or more of the nodes of the transformation chain. Accordingly, elements 400A through 400D may be referred to as transformation chain classes or transformation chain instances. The term "transformation chain" will be used to generally refer to both transformation chain classes and their associated transformation chain instances.

The example transformation chains 400A through 400D are relatively simple in order to avoid obscuring the broader principles described herein with an overly complex example. That said, the principles described herein apply regardless of how complex the transformation chain, and regardless of the number of transformation chains and associated devices that are within the environment and forming the compound application.

In the notation of FIGS. 4A through 4D, the nodes that belong to the transformation class 400N (where N ranges from A through D) are represented using the suffix N. For instance, in FIG. 4A, the transformation chain 400A includes nodes 401A, 402A, 403A, and 404A. The remaining elements 401B, 401C and 401D do not end with the "A" suffix, and thus are not nodes within the transformation chain 400A. Instead, the elements 401B, 401C and 401D represent dependencies with other transformation chains.

Throughout FIGS. 4A through 4D, 5A through 5D, 6A through 6C, and 7, to emphasize those elements that are dependency elements, rather than nodes in the transformation chain itself, dependency elements are represented with dashed-lined boundaries. Data does not flow from a node to a dependency element unless the transformation chain is joined with another transformation chain that includes a node represented by the dependency element. The fact that data cannot flow along a particular transformation is represented throughout the figures by the link being marked with an "X".

For instance, element 401B in transformation chain 400A represents a dependency with node 401B in the transformation chain 400B. The dependency element 401B is bordered with dashed lines, and all links leading to or from that dependency element 401B are marked with an "X" since at this stage, the transformation chain 400A is not joined with the transformation chain 400B. Element 401C in transformation chain 400A represents a dependency with node 401C in transformation chain 400C. Element 401D in transformation chain 400A represents a dependency with node 401D in transformation chain class 400D.

On its own, the transformation chain instance 400A can function as an application. For example, a copy of a value or copies of values from data source 401A may be used to form a transformed result as a value or values of data target 404A. Furthermore, a copy of a value or copies of values from data sources 401A and 402A may be transformed to result in a value or values of data target 403A. If the transformation chain instance 400A is on its own, the transformations leading to and from the elements 401B, 401C and 401D are not evaluated.

The transformation chain 400B includes three nodes 401B, 402B and 403B. However, the transformation chain 400B also includes dependency elements 401A, 402A, 401C and 403C that reference a node in a different transformation chain. Again, the transformation chain instance 400B may operate independently as a single application. For example, a copy of a value or copies of values from data source 401B may be provided through a transformation to generate a resulting value or values for data target 402B. A copy of a value or copies of values from the data source 402B may be provided through a transformation to generate a resulting value or values for data target 403B.

Figure 5A:
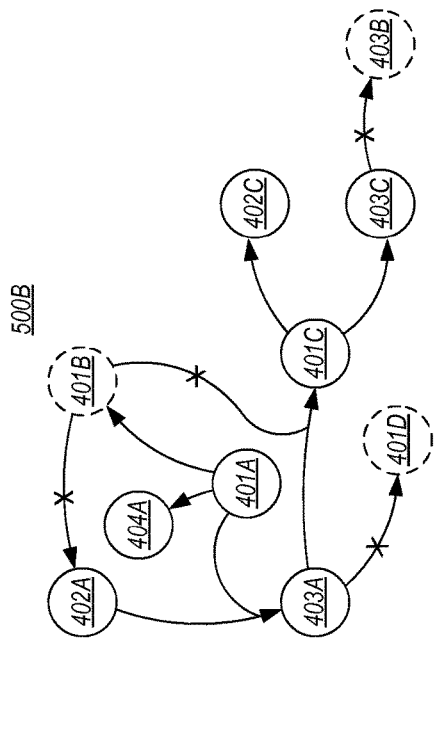
FIG. 5A illustrates an augmented transformation chain representing the joining of the transformation chains of FIGS. 4A and 4B.

Though the transformation chain instances 400A and 400B may operate independently, FIG. 5A illustrates a joined transformation chain 500A that includes transformation chain 400A joined with transformation chain 400B. Where appropriate, dependency elements in each of the transformation chains are now replaced with the actual node referred to. For example, dependency element 401B of FIG. 4A is now node 401B in FIG. 5A, and dependency elements 401A and 402A of FIG. 4B are now nodes 401A and 402A, respectively, in FIG. 5A. Thus, all of the nodes that have the suffix A or B are nodes within the transformation chain 500A, and only those nodes that have suffixes C or D are dependency elements. For example, nodes 401A, 402A, 403A, 404A, 401B, 402B and 403B are nodes within the augmented transformation chain 500A, and the functionality of the compound application becomes somewhat better, more complete, or at least different than the sum of the functionality of the individual transformation chains 400A and 400B on their own.

The transformation chain 400C includes three nodes 401C, 402C and 403C. However, the transformation chain 400C also includes dependency elements 403A, 401B and 403B that reference a node in a different transformation chain. Again, the transformation chain instance 400C may operate independently as a single application. For example, a copy of a value or copies of values from data source 401C may be provided through a transformation to generate a resulting value or values for data target 402C. Likewise, a copy of a value or copies of values from the data source 401C may also be provided through a transformation to generate a resulting value or values for data target 403C.

Figure 5B:
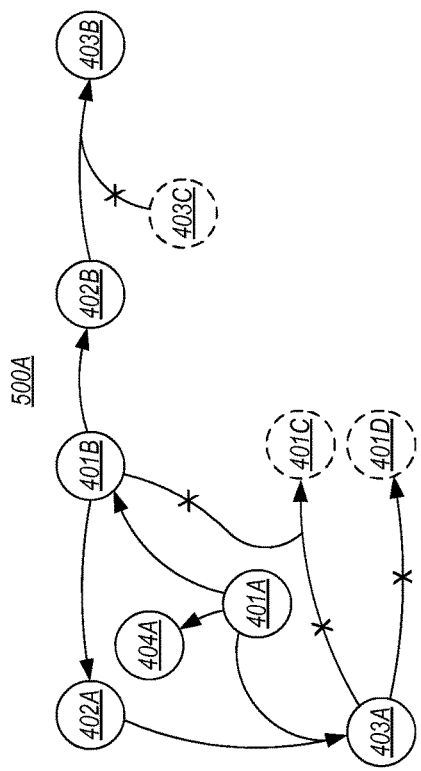
FIG. 5B illustrates an augmented transformation chain representing the joining of the transformation chains of FIGS. 4A and 4C.

Though transformation chain instances 400A and 400C may operate independently, FIG. 5B illustrates a joined transformation chain 500B that includes transformation chain 400A joined with transformation chain 400C. Dependency elements in each of the transformation chains are now replaced with the actual node referred to the extent that the dependency element refers to a node within any of transformation chains 400A or 400C. Now all of the nodes that have the suffix A or C are nodes within the transformation chain, and only those nodes that have suffixes B or D are dependency elements. For example, nodes 401A, 402A, 403A, 404A, 401C, 402C and 403C are nodes within the augmented transformation chain 500B. The functionality of the compound application becomes better, more complex, or at least different than the sum of the functionalities of the individual transformation chain instances 400A and 400C.

Figure 5C:
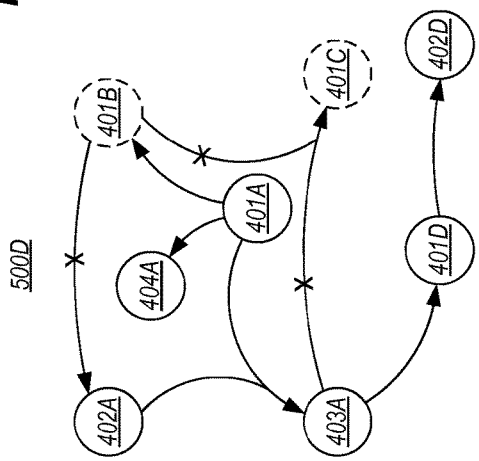
FIG. 5C illustrates an augmented transformation chain representing the joining of the transformation chains of FIGS. 4B and 4C.

FIG. 5C illustrates a joined transformation chain 500C that includes transformation chain class 400B joined with transformation chain class 400C. Dependency elements in each of the transformation chains are replaced with the actual node referred to the extent that the dependency element refers to a node within any of transformation chains 400B or 400C. Now all of the nodes that have the suffix B or C are nodes within the transformation chain, and only those nodes that have suffixes A or D are dependency elements. For instance, nodes 401B, 402B, 403B, 401C, 402C and 403C are nodes within the augmented transformation chain 500C, and the functionality of the compound application becomes better, more complex, or at least different than the sum of the functionalities of the individual transformation chain instances 400B and 400C.

Figure 6B:
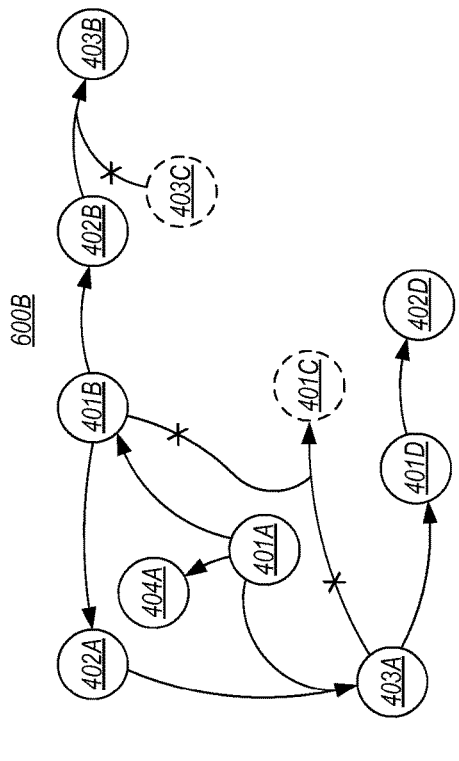
FIG. 6B illustrates an augmented transformation chain representing the joining of the transformation chains of FIGS. 4A, 4B and 4D.
Figure 6A:
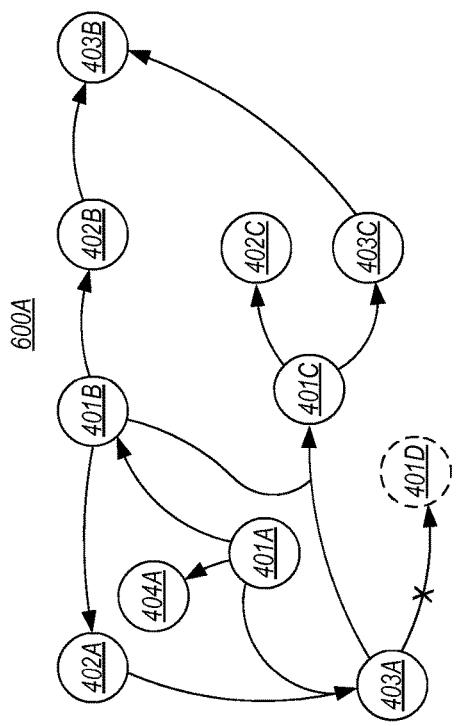
FIG. 6A illustrates an augmented transformation chain representing the joining of the transformation chains of FIGS. 4A, 4B and 4C.

FIG. 6A illustrates a joined transformation chain 600A that includes transformation chains 400A, 400B and 400C also being joined. Dependency elements in each of the transformation chains are replaced with the actual node referred to the extent that the dependency element refers to a node within any of transformation chains 400A, 400B or 400C. Note that all of the illustrated nodes are actually nodes in the transformation chain, except for dependency element 401D. The functionality of the compound application becomes better, more complex, or at least different than the sum of the functionality of the individual transformation chains 400A, 400B and 400C; the sum of the functionality of the individual transformation chains 500A and 400C; or the sum of the functionality of the individual transformation chains 400A and 500B.

The transformation chain 400D includes two nodes 401D and 402D. However, the transformation chain 400D also includes a single dependency element 403A referencing a node in a different transformation chain class 400A. Again, instances of the transformation chain class 400D may operate independently as a single application. For instance, a copy of a value or copies of values from data source 401D may be provided through a transformation to generate a resulting value or values for data target 402D.

Figure 5D:
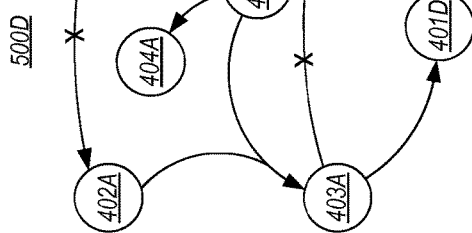
FIG. 5D illustrates an augmented transformation chain representing the joining of the transformation chains of FIGS. 4A and 4D.

Though transformation chain instances 400A and 400D may operate independently, FIG. 5D illustrates a joined transformation chain 500D that includes transformation chain 400A joined with transformation chain 400D. Dependency elements in each of the transformation chains are now replaced with the actual node referred to the extent that the dependency element refers to a node within any of transformation chains 400A or 400D. Now all of the nodes that have the suffix A or D are nodes within the transformation chain, and only those nodes that have suffixes B or C are dependency elements. For instance, nodes 401A, 402A, 403A, 404A, 401D and 402D are nodes within the augmented transformation chain 500D, and the functionality of the compound application becomes somewhat better than the sum of the functionality of the individual transformation chain 400A and 400D.

Note that FIGS. 5A through 5D illustrate all of the possible permutations involving two and only two of the transformation chains 400A, 400B, 400C and 400D. The transformation chains 400B and 400D are not joined directly in a two transformation chain combination, since neither transformation chain has a dependency element referring to a node in the other transformation chain. Furthermore, transformation 400C and 400D are not joined directly in a two transformation chain combination, since neither has a dependency reference to the other.

Figure 6C:
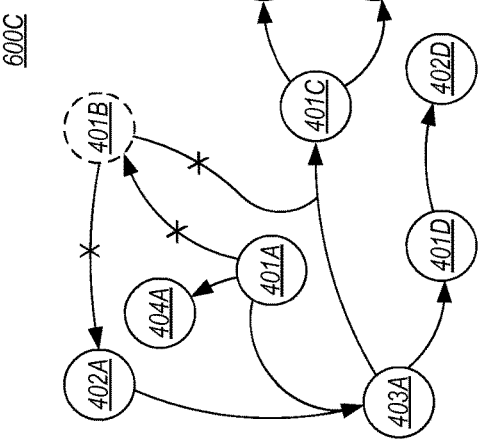
FIG. 6C illustrates an augmented transformation chain representing the joining of the transformation chains of FIGS. 4A, 4C and 4D.
Figure 7:
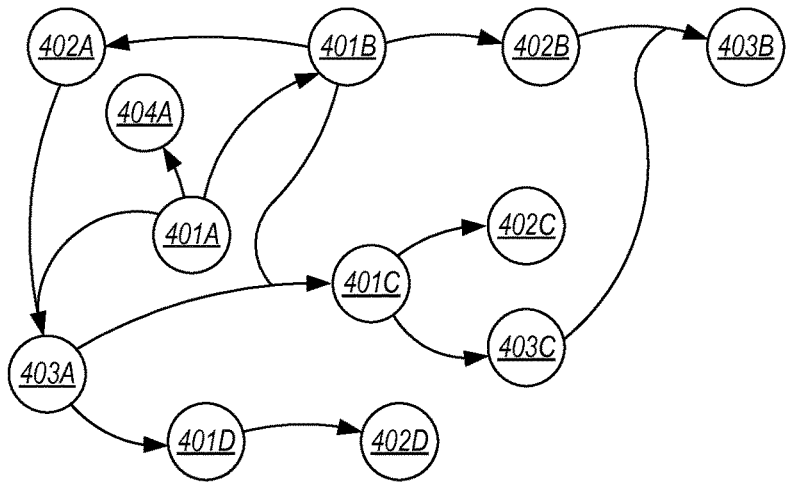
FIG. 7 illustrates an augmented transformation chain representing the joining of the transformation chains of FIGS. 4A, 4B, 4C and 4D.

FIG. 6A illustrates one of three possible combinations of three and only three transformation chains 400A, 400B, 400C and 400D. In particular, FIG. 6A illustrates an augmented transformation chain 600A that combines transformation chains 400A, 400B and 400C. FIG. 6B illustrates an augmented transformation chain 600B that combines transformation chains 400A, 400B and 400D (in which all nodes are part of the transformation chain except dependency elements 401C and 403C). FIG. 6C illustrates an augmented transformation chain 600C that combines transformation chains 400A, 400C and 400D (in which all nodes are part of the transformation chain except dependency elements 401B and 403B). Note that there is no combination of transformation chains 400B, 400C, and 400D illustrated since the transformation chain 400D includes no dependency references to transformation chain 400B (or vice versa), or to transformation chain 400C (or vice versa). FIG. 7 illustrates a combined transformation chain 700 that includes all of the transformation chains 400A, 400B, 400C and 400D combined.

Accordingly, given the transformation chains 400A, 400B, 400C and 400D in the environment, there are 8 possible compound applications that may be formed (corresponding to the transformation chains of FIGS. 5A through 5D, FIGS. 6A through 6C, and FIG. 7). Thus, as the transformation chains of various devices are joined into and decoupled from the environment, the very transformation chain itself changes, and the structure of the compound application thereby changes. For instance, a change in the value of data source 401A might have a very different impact on the transformation chain as the effects of that change are automatically propagated through one or more transformations, depending on whether that data source 401A is within transformation chain 400A alone, within transformation chain 500A, within transformation chain 500B, within transformation chain 500D, within transformation chain 600A, within transformation chain 600B, within transformation chain 600C, or within transformation chain 700.

Any of the nodes of a transformation chain may have zero or more input endpoints where inputs are received from an endpoint interface entity, and zero or more output endpoints where outputs are provided to an endpoint interface entity. In this description and in the claims, an "endpoint interface entity" is defined as a hardware entity and zero of more environmental criteria. In the case of there being zero environmental criteria associated with an endpoint interface entity, the endpoint interface is simply a hardware entity ((such as a device or computing system). In the description and in the claims, "a hardware entity" refers to any single or combination of physical items that have the capability to potentially interface with an endpoint. For instance, a hardware entity that provides input or receives input might be a data store, or a location in a data store, a user device, a microphone or microphone array, a camera or camera array, three-dimensional sensors, image recognizers, or the like. If the hardware entity and corresponding one or more environmental criteria together define an endpoint interface entity, then the hardware entity is indeed the endpoint interface entity so long as the environmental criteria are satisfied. However, if the environmental criteria cease to be satisfied, then the hardware entity would lose its status as an endpoint interface entity.

In this description, the terms "endpoint interface entity" and "hardware entity" may frequently be used interchangeably on the assumption that if the endpoint interface entity does have environmental criteria, that those criteria remain satisfied in that case. Furthermore, when the term "environmental criteria" is mentioned with respect to a hardware entity or an endpoint interface entity, the environmental criteria for the hardware entity becoming the endpoint interface entity may be different than the environment criteria for the hardware entity ceasing to be the endpoint interface entity. Thus, there may be some hysteresis built into the environmental criteria to avoid rapid changes in whether or not a particular hardware entity qualifies as a particular endpoint interface entity.

Examples of environmental criteria will now be provided with the understanding that the principles described herein are not limited to any particular environment criteria. One environmental criterion might be that the hardware entity has an associated identified user or identified group of users. For instance, if a given user or group of users is using a hardware entity, then the hardware entity may become an endpoint interface entity. If another user or group of users is using the hardware entity, then perhaps the hardware entity does not act as an endpoint interface entity. Other examples of environmental criteria might include the position, vantage point, or orientation of a user or group of users within an environment and/or with respect to a hardware entity, the position of an audio source in the environment, background noise levels, whether an audio signature is present, whether a security zone surrounding the environment has been violated, whether an individual has fallen in the environment, the temperature of the environment, the available network connections in the environment, a lighting level and/or configuration, a time of day or week or month or year, and so on for any imaginable environmental criteria.

As an example, a mounted flat panel display having multiple viewers oriented to be able to see the flat panel display might be an appropriate endpoint interface device, but if there is but a single viewer, and the node has input endpoints, perhaps a touchscreen device in the hands of the single viewer might be the better endpoint interface device for a given endpoint. As a second example, suppose that there was output was being displayed on a television, and a security system is activated, the activation of the security system might be an environmental criteria that causes some or all of the information displayed on the television to be obscured, or perhaps even cause the television to stop being an endpoint interface entity, and thus disconnect from the application.

Figure 8:
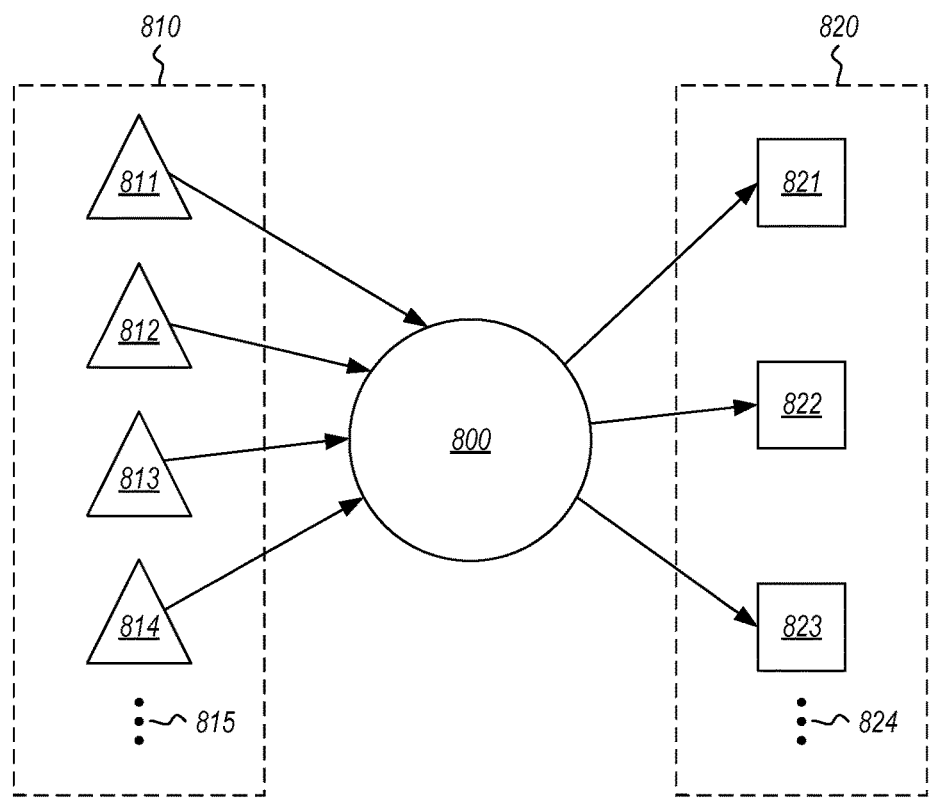
FIG. 8 illustrates a node of a transformation chain along with numerous associated input endpoints and output endpoints.

FIG. 8 illustrates a node 800 of a transformation chain that includes input endpoints 810 and output endpoints 820. The input endpoints 810 are illustrated as including endpoints 811 through 814, are represented as triangles, with the ellipses 815 representing that the node 800 may have any number of input endpoints. The output endpoints 820 are illustrated as including endpoints 821 through 823, are represented as squares, with the ellipses 824 representing that the node 800 may have any number of output endpoints. The number and type of input and output endpoints may be defined by the transformation chain class(es) that include the node, or the class may provide flexibility in how many input and/or output endpoints are included with each instance of node 800 in its respective instances of those transformation chain class(es). The endpoints themselves may be considered to be trivial nodes of a transformation class as all they do is provide output to, or receive input from a respective endpoint interface entity. The endpoints are generally not illustrated in FIGS. 1 through 7. The endpoint are however, the mechanism by which the transformation chains interact with the physical world through storage, display, input, actuation, audio, text, or the like.

The general concept of the transformation chains has been described with respect to FIGS. 1 through 8 with respect to specific examples of transformation chains that have particular nodes and particular dependency elements. However, the principles described herein apply to any transformation chain having any number of nodes and any number of dependency elements, regardless of the function of the node and identity of the dependency element. Accordingly, the principles described herein may be applied to a limitless variety of transformation chains performing a limitless variety of functions. One or more endpoint interface entities have credentials to interface with the endpoints of a transformation chain instance or portions thereof. Such credentials may include credentials to provide input to some or all of the endpoints of one or more or all nodes of a transformation chain instance, credentials to receive output from some or all of the endpoints of one or more or all nodes of a transformation chain instance, or even the power to delegate credentialed power to one or more delegate endpoint interface entities.

Transformation Chain Supporting Architecture

In accordance with the principles described herein, an architecture is described in which transformation chains may be combined incrementally forming dynamically changing functions at runtime, thereby changing the concept of what an application is. With the benefit of reading this description, transformation chains are like molecules floating within an environment, and with the proper impetus, such molecules combine resulting in a compound that operates differently from its constituent parts. For instance, given the right impetus, two hydrogen molecules may combine with an oxygen atom to formulate a molecule of water. While liquid hydrogen and liquid oxygen cannot be consumed by humans, liquid water can and must be consumed by human beings. Thus, the principles described herein allow molecules of transformation chains to be joined dynamically and incrementally to formulate customized applications that provide customized functionality that is suitable to the impetus experienced. Such applications may be so customized that there may be times that a particular application is only constructed once.

The principles described herein also allow a delegator endpoint interface entity to delegate power to another delegate endpoint interface entity to interface with certain endpoints, without the delegator endpoint interface entity giving up control of how the delegate endpoint interface affects the transformation chain instance. Accordingly, the principles described herein also allow a transformation chain to be safely split.

Through atomic and molecular composition, a seemingly infinite variety of animate and inanimate objects, and entire worlds, have formed. Currently, there are only 115 known elements in the periodic table of the elements from which an infinite variety of animate and inanimate objects throughout the universe are composed. Using only a limited number of transformation chains, that may be combined in certain ways, there is a substantially limitless variety of applications of a substantially limitless variety of functions that may be generated in a universe of possible applications. Accordingly, the principles described herein describe a new organic paradigm in incrementally building application and sharing split applications to suit the very present circumstances. Furthermore, the principles described herein allow for the careful tracking of credentials of which endpoint interface entity may interact with which endpoint of which nodes of which transformation chains, and allows for temporary, or even permanent delegation of such credentials to other endpoint interface entities. Accordingly, a wide variety of collaboration scenarios are enabled in such an organic application environment.

Figure 9:
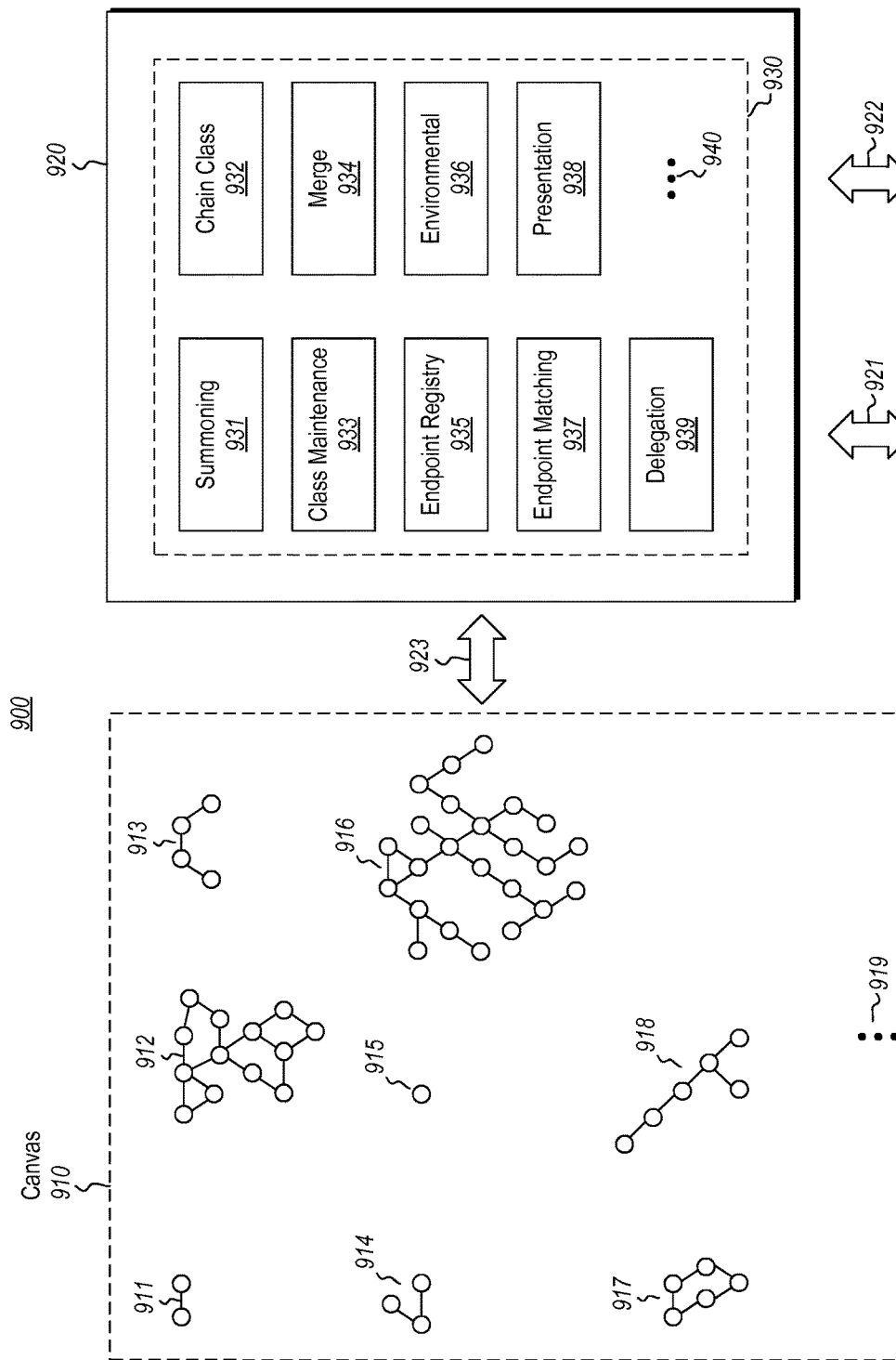
FIG. 9 illustrates a runtime architecture in which transformation chains may be implemented, and which includes a canvas referred to herein as a universal canvas.

FIG. 9 illustrates a runtime architecture 900 in which this new paradigm in applications may be implemented. The runtime architecture 900 includes a universal canvas 910. The universal canvas 910 represents the universe in which transformation chain instances are formed, combined, operated, and extinguished. As an example, the universal canvas 910 is illustrated as operating eight transformation chains 911 through 918 of varying complexity. However, the ellipses 919 represent that the universal canvas 910 may run many transformation chain instances. Given sufficient resources, the universal canvas 910 may even run millions or billions of application chain instances.

The runtime architecture also includes a supporting architecture 920 that includes modules and components that operate outside of the observable universal canvas 910, to ensure the appropriate formation, combination, sharing, operation, and extinguishing of the transformation chain instances. The supporting architecture 920 itself can receive input and provide output at represented by bi-directional arrow 921. The supporting architecture 920 may also provide access to services as represented by bi-directional arrow 922. The supporting architecture 920 also interacts with the universal canvas 910 as represented by the bi-directional arrow 923 for purposes of instantiating transformation chains, combining transformation chain instances, altering transformation chain instances, enforcing credentialed use of the transformation chain instances by appropriate endpoint interface entities, extinguishing transformation chain instances, and the like.

The precise physical platform on which the universal canvas 910 is run is not critical. In fact, there can be great flexibility and dynamic change in the physical platform on which the universal canvas 910 is operated. Some nodes of some transformation chains may be operated by one physical platform (such as a device, endpoint interface entity, system, or cloud, while other nodes operate another physical platform). In one embodiment, the universal canvas 910 operates in a cloud computing environment, such as a private cloud, a hybrid cloud, or a public cloud. As an example, the universal campus may be within a local network, in a peer-to-peer computing network, in a cloud computing environment, in any other network configuration, or in any combination of the above. Even so, as previously mentioned, the universal canvas interfaces with the physical world through the endpoints of the various nodes of the transformation chain instances.

Likewise, the supporting architecture 920 may be operated in any computing environment, in peer-to-peer computing network, in a local network, any other network configuration, or in any combination of these. In the case where the transformation chain instances within the universal campus 910 operate fully or primarily, or even party in a cloud computing environment, it may be this same cloud computing environment that operates the supporting architecture.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The supporting environment 920 includes a number of modules 930. One of the modules 930 is a summoning module 931 that interprets input and in response determines that a class of a transformation chain is to be instantiated. For instance, the input may be received directly from input (from arrow 921) to the supporting environment 920 or via input from a transformation chain instance running in the universal canvas 910 itself. Input that may be received from either source will be referred to herein as "general input". Summoning criteria are used for recognizing that certain general input is to result in a transformation chain instance being created. Summoning criteria may be also any environmental criteria at all. For instance, the summoning criteria may take into account not just verbal conversations, or explicit user input directed at a hardware entity, but may also take into consideration other environmental factors. For instance, whether a particular user is sitting down, moving away, looking somewhere, being near a device with a touch screen, and so forth, may also be environmental criteria used as summoning criteria for summoning an instance of a transformation chain class to be created within the universal canvas 910.

The modules 930 also includes a chain class module 932 that instantiates transformation chain instances in response to determinations made by the summoning module 931 and/or in response to general input.

The modules 930 also includes a chain class maintenance module 933 that maintains a copy of each transformation chain class. The chain class maintenance module 933 may add to the library of available transformation chain classes in response to a determination made by the summonsing module 931 and/or in response to general input. Thus, the chain class maintenance module may maintain a registry of transformation chain classes. For instance, the chain class maintenance module 933 might merge classes along their appropriate points of dependency, or perhaps create a transformation chain class that represents a redacted or truncated version of a pre-existing transformation chain class. Some transformation chain classes may be created temporarily, whilst others may have more lasting persistence. Furthermore, authentication and authorization may be imposed so as to restrict which entities may instantiate transformation chains of certain classes.

A merging module 934 merges instances of transformation chains to be operated in the universal canvas 910 in an appropriate way given the dependencies of the transformation chains. Such merging occurs in response to determinations made by the summoning module 931 and/or in response to other general input. The merging criteria may also be any general environment criteria. Again, the merging criteria may take into account not just verbal conversations, or explicit user input directed at a hardware entity, but may also take into consideration other environmental factors that are deemed appropriate for the merging to occur.

An endpoint interface entity registry module 935 maintains a registry of all possible endpoint interface entities (hardware entities and potentially associated user criteria), as well as which endpoint interface entities are presently active and available given a particular instantiated transformation chain operating within the universal canvas 910.

An environmental module 936 detects when endpoint interface entities become active or inactive for a given instantiated transformation chain operating within the universal canvas 910. For instance, the environmental module 936 might detect when an initiating set of environment criteria for a hardware entity of a particular endpoint interface entity begin to be met resulting in the endpoint interface entity being available for the application (for interacting with the endpoints of the application). Likewise, the environment module 936 might detect when a terminating set of one or more environmental criteria for the hardware entity of the particular entity is met resulting in the endpoint interface entity no longer being available for the application.

An endpoint matching module 937 determines which active endpoint interface entities for an instantiated transformation chain are capable of and credentialed to provide input for each input endpoint of that transformation chain that is capable of receiving input from the physical world, and determining a proper form of the input given that endpoint interface entity. The endpoint matching module 937 also determines which active endpoint interface entities for an instantiated transformation chain are capable of and credentialed to receive output for each output endpoint of the transformation chain that is capable of presenting output into the physical world.

The modules 930 includes a presentation module 938 that, when there are multiple eligible endpoint interface entities that are capable of providing input into an input endpoint, decides which endpoint interface entity is to provide that input, and potentially decides that multiple endpoint interface entities are capable of providing input into that input endpoint. Furthermore, when there are multiple eligible endpoint interface entities that are capable of rendering output from an output endpoint, the presentation module 938 decides which endpoint interface entity is to provide that input, and potentially decides which of multiple endpoint interface entities are to render the output received from the output endpoint.

The presentation module 938 also decides whether any restrictions are to be imposed when a particular endpoint interface module provides input to an input endpoint of a transformation chain. The presentation module 938 may also decide whether there are any restrictions that are to be imposed when a particular endpoint interface module renders output from an output endpoint of a transformation chain. When that output is visualizations, the presentation module 938 may decide how visualized information is to be formatted and/or laid out on the display of the endpoint interface entity.

The modules 930 also includes a delegation module 939 that allows and facilitates credentialed endpoint interface entity to delegate power to a delegee endpoint interface entity with respect to receiving output from or providing input to particular endpoints of a transformation chain instance. As such, delegation module 939 facilitates splitting of transformation chain application, thereby allowing dynamic movement into and out of collaborative scenarios. There may be other modules within the modules 930 as represented by the ellipses 940.

Transformation Chain Operation

Having now described transformation chain applications, and an architecture that facilitates operation of transformation chain applications with respect to FIGS. 1 through 9, example operations of the transformation chains and the supporting architecture will now be described with respect to FIGS. 10 through 24. First, the dynamic building of transformation chain instances will be described.

The dynamic building of transformation chain instances will now be described. In accordance with the principles described herein, transformation chains may be combined incrementally and with ease of effort forming dynamically changing functions at runtime. Transformation chains are like molecules floating within an environment, and with the proper impetus, such molecules combine resulting in a compound that operates differently from its constituent parts. Thus, the principles described herein allow instances of transformation chains to be joined dynamically and incrementally to formulate customized applications that provide customized functionality that is suitable to the impetus experienced.

As a concrete example, suppose that there is a transformation chain that extracts received orders from a database. A verbal command to "show me my orders" by a sales representative might instantiate that transformation chain class, filter by the user that stated the verbal command, and visualize the filtered list or orders. A subsequent join instruction might be "Fetch me my customers", which might then cause another transformation chain to automatically join with the prior transformation chain to match customers with orders, and visualize the orders by customers. The user might then state "add order exceptions for customers" causing perhaps yet another transformation chain to join the existing transformation chain aggregation, and/or cause input to be made to an existing node of the current aggregation of transformation chains. At each stage, the user may determine based on the current state of the aggregated transformation chain what is lacking, and state or input further joining instructions, from which yet other transformation chains may be join in the growing customized application chain. In essence, the application is built as the user thinks and expresses intuitively what he or she wants, and the application is built in a manner that is sensitive to the environment.

Figure 10:
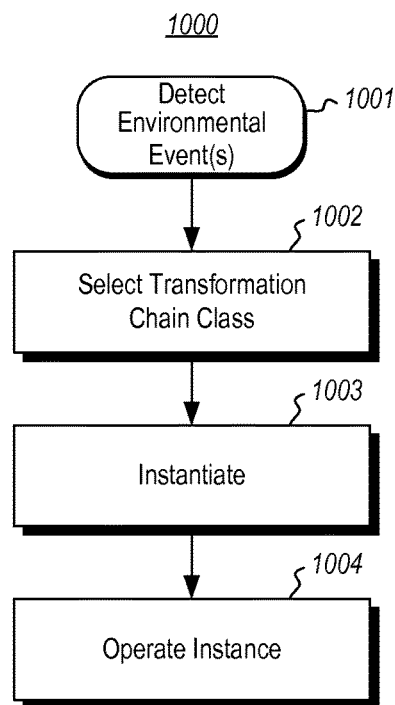
FIG. 10 illustrates a flowchart of a method for formulating an application in response to detecting events in an environment, which represents a simple case in which an instance of a transformation chain is created and operated within the universal canvas of FIG. 9

FIG. 10 illustrates a flowchart of a method 1000 for formulating an application in response to detecting one or more environment events, which represents a simple case in which an instance of a transformation chain is created and operated within the universal canvas 910. First, a set of one or more environmental events (e.g., the presence of a user) is detected (act 1001). For instance, the summoning module 931 might detect one or more environmental events that are to trigger instantiation of a particular transformation chain class.

Responsive to the detected environment event(s), the transformation class corresponding to the input is selected (act 1002). For instance, the summoning module 931 or the chain class module 932 may select which of the available transformation chain classes (maintained by the chain class maintenance module 923) corresponds to the detected environmental event(s).

An instance of the transformation chain class is then created (act 1003). For instance, the chain class module 932 might instantiate an instance of the identified transformation chain class. When instantiating the transformation chain class, the endpoint interface entity matching module 937 may provide appropriate credentials to one or more appropriate endpoint interface entities so that such entities are credentialed to receive output from and/or provide input to one or more endpoints of the transformation chain instance.

Optionally, the instance may then be operated (act 1004). For instance, in FIG. 9, the instance of the transformation chain class may be deployed and operated within the universal canvas 910.

As part of this operation (act 1004), the environmental module 936 detects which of the registered endpoint interface entities are active for the given instantiated transformation chain. Furthermore, the endpoint interface entity matching module 937 determines which active endpoint interface entity endpoints for the instantiated transformation chain should provide input for each endpoint of each node of the transformation chain that is capable of receiving input from the physical world, and what forms of input are acceptable. Furthermore, the endpoint interface entity matching module 937 determines which active endpoint interface entities for the instantiated transformation chain should receive output for each output endpoint of each node of the transformation chain that is capable of realizing (e.g., visualizing, rendering, sounding, storing, actuating, and the like) output into the physical world, and what forms of output are acceptable.

Figure 11:
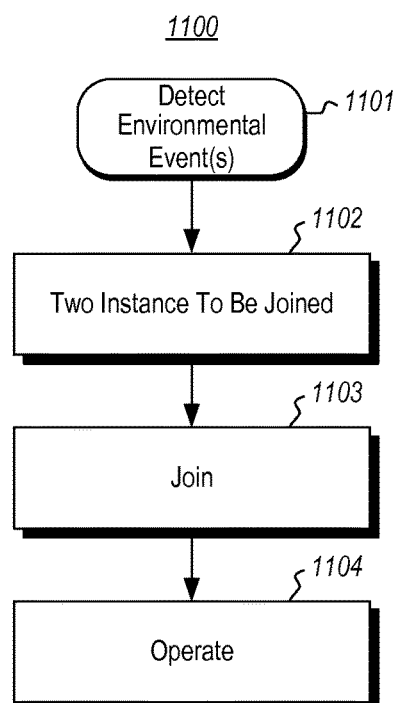
FIG. 11 illustrates a flowchart of a method for responding to detecting events in the environment by combining transformation chain instances.

At some point, further environmental events) are detected (such as user input) which directs that an instance of another transformation chain class is to be combined with an existing transformation chain instance. Accordingly, FIG. 11 illustrates a flowchart of a method 1100 for responding to further detected environment events) to thereby combine transformation chain instances. The method 1100 is initiated by detecting further environmental events) (act 1101) that is constituent with combination of two instances of transformation classes.

As an example, a transformation chain instance may be combined with the instance created in method 1000, or perhaps may be combined with an instance of a transformation chain created by a previous performance of the method 1100 of FIG. 11. Although not required, the instance to which the transformation chain instance is to be joined may have previously operated as an application already. Thus, the method 1100 may be repeatedly performed in order to build a sophisticated and customized transformation chain in response to various detected environmental events.

The detected environment events of act 1101 may be an expressed instruction to join. For instance, the user might have a user interface that allows explicit selection of a desired application chain class to be instantiated. Alternatively, the detected environment events of act 1101 may simply be an implicit indication that two transformation chain instances should be joined. For instance, the detected environment events might be any activity, such as particular speech, that is consistent with the joining of two instances of different transformation chain classes. Such input could include gestures, requests, and the like. For instance, as previously mentioned, a sales representative might state "fetch me my customers" in the context of the representatives corresponding orders already being visualized. The system may even guess at what transformation chain the user might want based on history and current context. In that case, the user establishing the current context could be the environmental event(s) that cause the new transformation chain to be instantiated that the system guesses may be desired at some future point. For instance, perhaps the system knows that when in a particular conversation the users keep talking about a particular order, the system might join transformation chain instances used to acquire that order in anticipation of showing that order. Whatever form the joining environment event(s) takes, the summoning module 931 of FIG. 9 detects appropriate environmental event(s) that corresponds to the instantiation of a transformation chain class (as described with respect to FIG. 10) or the joining of two transformation instances (as will be described with respect to FIG. 11).

The method 1100 then includes determining, from the further detected environmental event(s), that an instance of one transformation chain class is to be joined with an instance of another transformation chain class (act 1102). For instance, as described above, there are class-level restrictions in which the transformation chain class author expressly makes it possible, at least under some conditions, for instances of two transformation chain classes to be joined. For instance, the dependency elements of FIGS. 4A through 6C are an example of such class-level restrictions and authorizations.

However, there may also be instance-level authorization. As an example, the act 1002 may involve consulting a set of one or more rules defining one or more conditions for joining an instance of the first transformation chain class and the second transformation chain class. This set of rules may be dynamic and change over time. For instance, the joining logic may learn over time that certain gestures or other user activity is, or is not, indicative of a user intent or anticipated future user intent to combine such instances. Accordingly, the supporting architecture may observe a history associated with each of multiple users in order to, over time, more accurately predict user intention, depending on a history of a particular user, or group of users, and thereby formulate an appropriate set of summoning and merging criteria. The act 1102 may be performed by, for instance, by the chain class module 932 with reference to the transformation chain classes known to the class maintenance module 933. The endpoint interface entity matching module 937 may reevaluate which endpoint interface entities have credentials to interface with which endpoints of the composite aggregated transformation chain instance.

The author of a transformation chain class might also express restrictions at the granularity of a single dependency. For instance, in the dependence element 401B of transformation chain class 400A, the author might express that joining is authorized on that dependency element only if the transformation chain into which it is joined does not include an identified transformation chain class authored by a competitor. The author might also control data that is flowed out of the transformation chain to another joined transformation chain by writing restrictions or conditions into the transformation that would bridge the dependency itself (e.g., between nodes 401A and dependency element 401B).

However, even though transformation chain classes may interoperate, that does not mean that the user wants their particular instance of that transformation chain class to join with other instances of other transformation chain classes. After all, the data itself (e.g., the instance state) might be sensitive to the user. Accordingly, the method also may include determining that instances of different transformation chain classes are to be joined.

The joining criteria for authorizing two instance of different transformation chain classes to join may include one or more of the following: whether or not the user is on a meeting attendee list, a relationship (e.g., family, social network friend, or the like) of users of the various devices, a communication capability (e.g., near field) between the devices, a proximity of the respective devices (e.g., in the same conference room), the request of the users, of the like. For instance, the joining criteria might include some business criteria such as the associated users of the instances are on the same team. As another example, one device might be a kiosk in a retail space or hotel, where a customer uses the kiosk and a shop assistant or concierge can automatically use their device to join their transformation chain with that of the kiosk to thereby interact with the customer using the compound application. Conditions may be applied to the joining criteria. For instance, a bellhop's device might be able to join a customer's application if the concierge is not around (perhaps detected by the concierge not actively using the pairable application to join with that of customers, or being off network).

In some embodiments, the first transformation chain class used to instantiate the first of the two instances to be joined may be derived from an existing transformation chain class. As an example, the first transformation chain class may be the same as the first transformation chain class, except with one or more nodes of the transformation chain removed.

In response to the act of determining that the two instances are to be joined (act 1102), the two instances are joined (act 1103), so as to establish connections across one or more flow dependencies of the instance, thereby creating new avenues for data flow, and new application functionality. For instance, this joining may be accomplished by the merging module 934. The joined instance may thereafter be operated (act 1104).

Figure 12A:
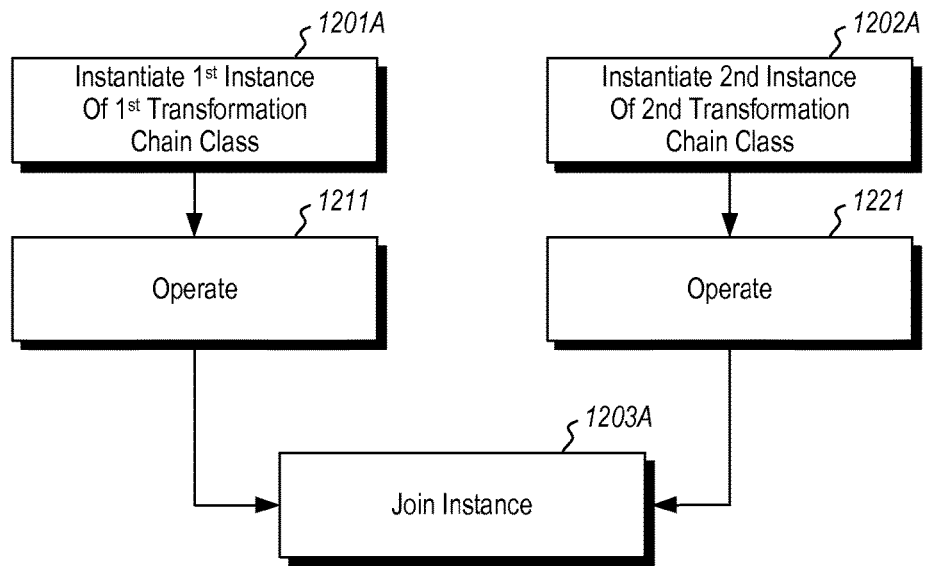
FIG. 12A illustrates a flowchart of a method for formulating an integrated instance of two transformation chain classes by first instantiating instances of each class, and then joining the instances.

In one embodiment, the instances themselves are directed joined without defining any new combined transformation chain classes. For instance, FIG. 12A illustrates a flowchart of a method 1200A for joining two instances and represents an example of the act 1103 of FIG. 11. The first instance of the first transformation chain class is instantiated (act 1201A) and perhaps operated (act 1211). Furthermore, the second instance of the second transformation chain class is instantiated (act 1202A) and perhaps operated (act 1221). Thereafter, the two instances are joined (act 1203A).

Figure 12B:
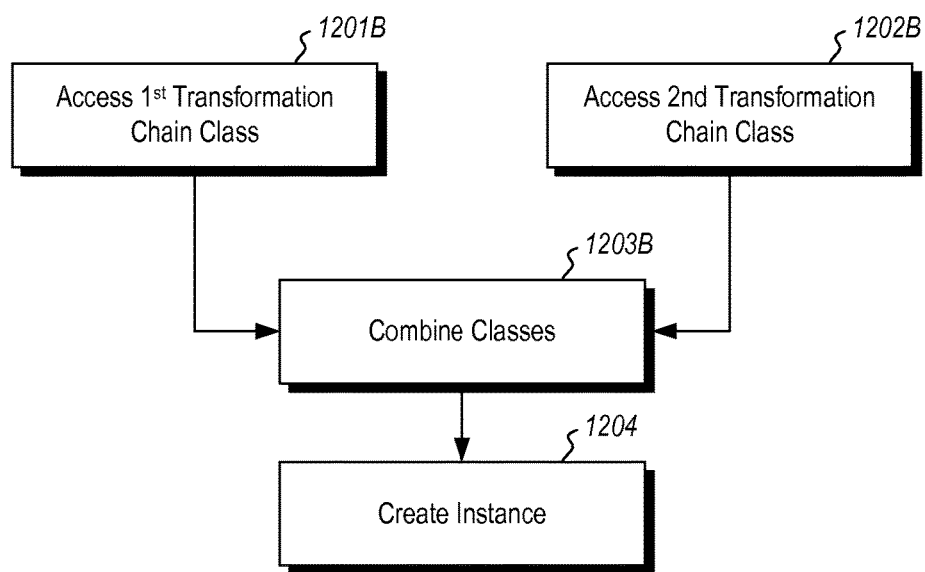
FIG. 12B illustrates a flowchart of a method for formulating an integrated instance of two transformation chain classes by first combining the two transformation chain classes, and then instantiating from the combined transformation chain class.

In other embodiments, the transformation chain classes themselves are aggregated to define a new combined class, and an instance of that aggregated class is instantiated to thereby accomplish act 1103. The combined instance may exist temporarily, may be kept for the benefit of a limited number of one or more users, or may even be added to the library of transformation chain classes that are available for more widespread use. For instance, FIG. 12B illustrates a flowchart of a method 1200B that represents another example of the act 1103 of FIG. 11. The first transformation chain class is accessed (act 1201B) and the second transformation chain class is accessed (act 1202B). The two classes are then combined (act 1203B). An instance is then created from the combined transformation chain class (act 1204).

As an example only, perhaps method 1000 or act 1201A of method 1200A might be employed to create an instance of a transformation chain of FIG. 4A. Now suppose that environmental event(s) are detected that suggest combination of instances of transformation chains of FIGS. 4A and 4B. Method 1100 may then be performed to create the instance of the transformation chain of FIG. 5A. In that case, act 1201A of method 1200 would instantiate from the transformation chain class of FIG. 4A, and act 1202A of method 1200 would instantiate from the transformation chain class of FIG. 4B. The result may be thought of as an instantiation of the aggregated class of the classes of FIGS. 4A and 4B (which is represented in FIG. 5A).

Now suppose that environmental event(s) are detected that suggest combination of instances of transformation chains of FIGS. 5A and 4C. The method 1100 may then be performed to create the instance of the transformation chain of FIG. 5A. In that case, act 1201A of method 1200A would be used to instantiate (in which the result from the prior performance of the method to create the transformation chain instance of FIG. 5A could be viewed as instantiating from the aggregated classes of FIGS. 4A and 4B) an instance of FIG. 5A. Furthermore, act 1201B of method 1200 would be used instantiate from the transformation chain class of FIG. 4C. The result may be thought of as an instantiation of the aggregated class of the classes of FIGS. 5A and 4C (which is represented in FIG. 6A).

Now suppose that environmental events are detected that suggests combination of instances of transformation chains of FIGS. 6A and 4D. The method 1100 may then be performed to create the instance of the transformation chain of FIG. 6A. In that case, act 1201A of method 1200A would be used to instantiate an instance of FIG. 6A. Furthermore, act 1201B of method 1200 would be used instantiate from the transformation chain class of FIG. 4D. The result may be thought of as an instantiation of the aggregated class of the classes of FIGS. 6A and 4D (which is represented in FIG. 7).

Having now described the general principles of transformation chains, the environment in which they may operate, and their principles of aggregation, this description will now address how a delegator endpoint interface entity having credentials on a transformation chain instance may delegate power to a delegee endpoint interface entity to receive output from particular endpoint(s) and/or provided input to particular endpoint(s). Accordingly, application splitting and sharing is made possible in this organic universal canvas of transformation chain instances.

Figure 13A:
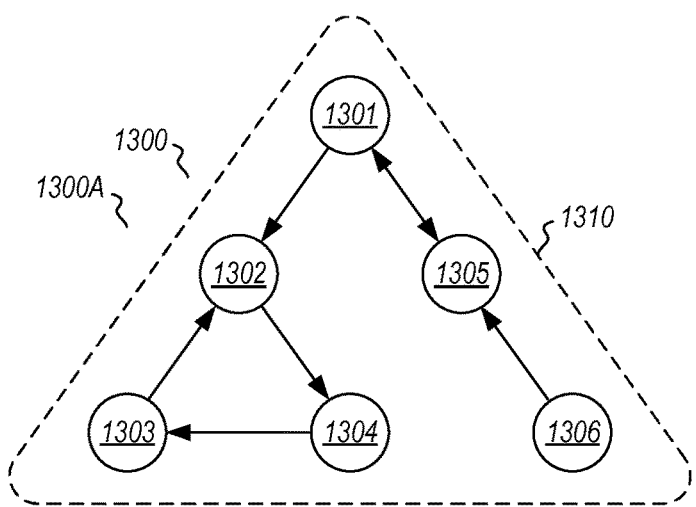
FIG. 13A illustrates a transformation chain instance that is preparing to be split.

FIG. 13A illustrates an example transformation chain 1300 in a state 1300A in which it is about to be split. FIG. 14 illustrates a flowchart of a method 1400 for formulating a split application. As the method 1400 may be performed in the context of the example transformation chains 1300A and 1300B of FIGS. 13A and 13B, respectively, the method 1400 of FIG. 14 will be described with frequent reference to the example transformation chains 1300A and 1300B.

As illustrated in FIG. 13A, the example transformation chain 1300A includes six nodes 1301 through 1306. Each of the nodes may have zero or more input endpoints and zero or more output endpoints. However, to keep the diagram cleaner, the endpoints are not illustrated for the example transformation chain 1300A of FIG. 13A. Likewise, the endpoints are not illustrated for the example transformation chain 1300B in FIG. 13B.

In the initial state 1300A of FIG. 13A, a particular endpoint interface entity (referred to herein as a "first endpoint interface entity") is credentialed to provide input to and receive output from endpoints of transformation chain 1300A. The scope of this credential is represented by the dashed lined boundary 1310.

Now suppose that the application represented by the transformation chain 1300A is to be split. That is, suppose that the first endpoint interface entity provides interaction or input suggesting that a transformation chain instance representing a portion of the larger transformation chain instance 1300A is to be created. There may be several reasons for performing such a split. One reason might be simply because the first endpoint interface entity is to use another instance of just that portion of the larger transformation chain class. Another reason might be to delegate input and/or output privileges associated with one, some, or all of the endpoints of those nodes that are part of the portion to another endpoint interface entity. In other words, the first endpoint interface entity assigns the portion of the transformation chain, at least temporarily, to the second endpoint interface entity. A redaction and share gesture may be used to express this intent to delegate. For instance, a user might cross over a certain portion of the user interface (indicating that the target endpoint interface entity is not to have the ability to view or input into those fields), and then indicate a share gesture.

In any case, interaction and/or environmental event(s) are detected that are representative of splitting an instance of a smaller class off of the larger transformation chain class (act 1401), thereby initiating the method 1400 of FIG. 14. Based on the detected environment event(s), the system determines that a portion transformation chain class is to be created (act 1402) that represents a portion of the larger transformation chain class. This determination might be made by, for instance, the delegation module 939 of FIG. 9. For instance, referring to FIG. 13A, suppose that a portion transformation chain class is to be created that is represented only by nodes 1305 and 1306. In response, an instance of the portion transformation chain class is instantiated (act 1403) and operated (act 1404). For instance, the second endpoint interface entity may be instructed (by the first endpoint interface entity and/or by the delegation module 939) to interact with the endpoints of the instantiated portion transformation chain class. The instantiated portion transformation chain class may be sent to the second endpoint interface entity.

Figure 13B:
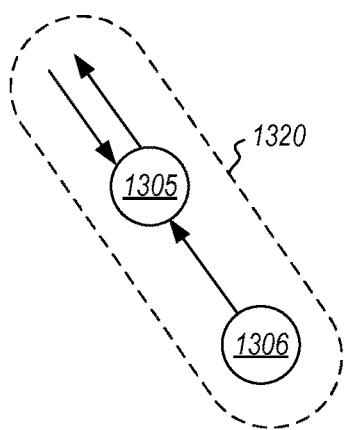
FIG. 13B illustrates a transformation chain instance that is split from the transformation chain instance of FIG. 13A.
Figure 14:
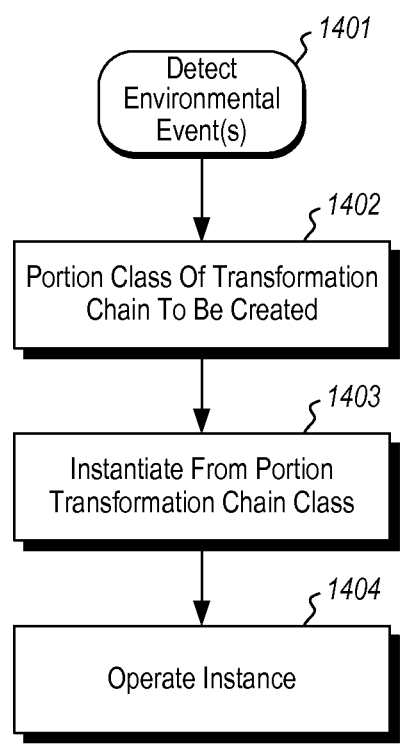
FIG. 14 illustrates a flowchart of a method for formulating a split application.

FIG. 13B represents the portion resulting transformation chain 1300B that includes just the node 1305 and the node 1306. A dotted lined border 1320 is illustrated to represent that a particular endpoint interface entity may have credentials to interface with some or all of the endpoints of the nodes 1305 and 1306. In one embodiment, the splitting is not made for purposes of delegation, and the first endpoint interface entity also has credentials to interface with the endpoints of nodes 1305 and 1306 in the new portion transformation chain 1300B. However, a very useful scenario is that the first endpoint interface entity has delegated privileges to a second endpoint interface entity to interface with at least some endpoints of the nodes 1305 and 1306 of the portion transformation chain 1300B.

FIG. 15A through 15D illustrate several possible embodiments of how such delegation might occur from the perspective of the portion transformation chain 1300B. In the symbolism of FIGS. 15A through 15D, a node represented by dashed lined borders represents a node of which only some of the endpoints of the original node are available for interfacing with the second endpoint interface entity.

Figure 15A:
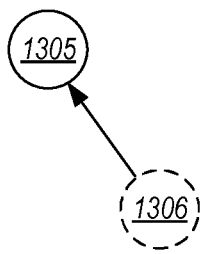
FIGS. 15A through 15D illustrates various possible configurations for the split transformation chain instance of FIG. 13B.

In the embodiment 1500A of FIG. 15A, the node 1305 is illustrated with as a solid circle, representing that all endpoints of the node 1305 have been instantiated and made available to the second endpoint interface entity. Meanwhile, the node 1306 is illustrated with a dashed-lined circle, representing that only a portion of the endpoints of the node 1306 have been instantiated and made available to the second endpoint interface entity.

Figure 15B:
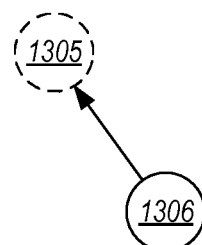

In the embodiment 1500B of FIG. 15B, the node 1306 is illustrated with as a solid circle, representing that all endpoints of the node 1306 have been instantiated and made available to the second endpoint interface entity. Meanwhile, the node 1305 is illustrated with a dashed-lined circle, representing that only a portion of the endpoints of the node 1305 have been instantiated and made available to the second endpoint interface entity.

Figure 15C:
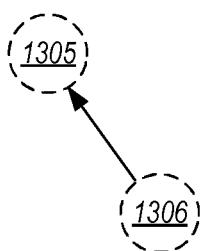

In the embodiment 1500C of FIG. 15C, the nodes 1305 and 1306 are both illustrated with a dashed-lined circle, representing that only a portion of the endpoints of each of the nodes 1305 and 1306 have been instantiated and made available to the second endpoint interface entity.

Figure 15D:
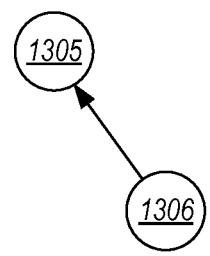

In the embodiment 1500D of FIG. 15D, the nodes 1305 and 1306 are both illustrated as a solid circuit, representing that all of the endpoints of each of the nodes 1305 and 1306 have been instantiated and made available to the second endpoint interface entity.

Note that there need be no change to the instance of the transformation chain 1300 that is in state 1300A from the perspective of the first endpoint interface entity. In that case, whatever endpoints are created for nodes 1305 and 1306 for the second endpoint interface entity may simply be cloned endpoints. During operation, if a cloned input endpoint received inconsistent input from both the first endpoint interface entity and the second interface entity, merging criteria may resolve the inconsistency. For instance, perhaps inconsistencies are resolved in favor of the delegating endpoint interface entity. Merging operations may be provided by, for instance, the delegation module 939 of FIG. 9.

In an alternative embodiment, a remainder instance may be created that represents a logical remainder when the portion instance 1300B is subtracted from the larger instance 1300A, and thus no endpoint are cloned at all. For instance, in the case of FIG. 15D, in which the second endpoint interface entity is given access to all endpoints of the nodes 1305 and 1305, a remainder instance may be created with just the nodes 1301 through 1304. In the case of FIG. 15A, the remainder instance might include nodes 1301 through 1304 and a limited form of node and 1306 with only the endpoints that were not included with the node 1306 of the remainder instance being included in the portion instance 1500A. In the case of FIG. 15B, the remainder instance might include nodes 1301 through 1304, and a limited form of node 1305 with only the endpoints that were not included with the node 1305 of the remainder instance being included within the portion instance 1500B. In the case of FIG. 15C, the remainder instance might include nodes 1301 through 1304, and a limited form of node 1305 and 1306 with only the endpoints that were not included with the nodes 1305 and 1306 of the remainder instance being included within the portion instance 1500B.

In operation, the delegation module 939 may allow the first endpoint interface entity to maintain control or supervision over the actions of the second endpoint interface entity in interacting with the portion 1300B of the transformation chain 1300A. For instance, the second endpoint interface entity may be credentialed through the first endpoint interface with respect to the portion 1300B such that data flows to and from the instance of the portion transformation class 1300B are approved by and/or channeled through the remainder of the transformation chain 1300A controlled by the first endpoint interface entity. Furthermore, the access of the second endpoint interface entity to data (such as a data service) is strictly controlled. Data for nodes that are not within the portion transformation chain class are provided via the approval of the first endpoint interface entity.

Figure 16:
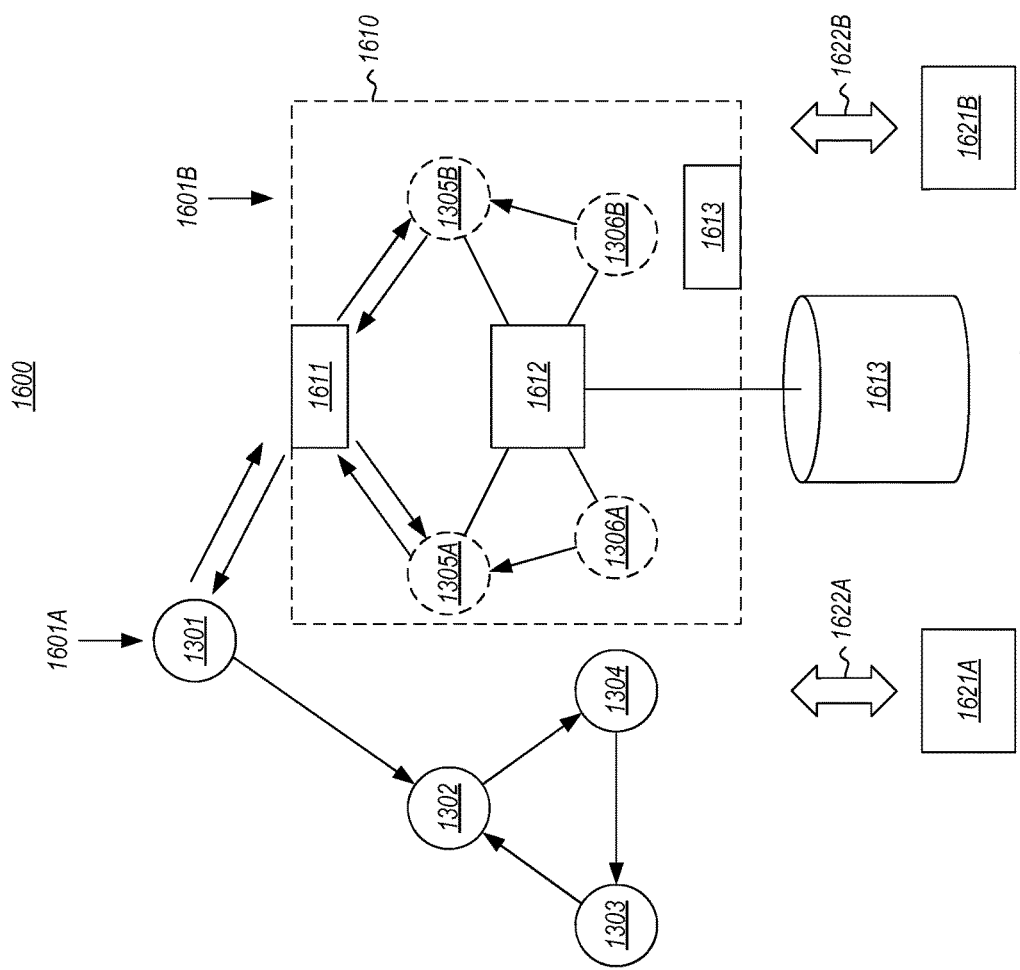
FIG. 16 illustrates an architecture in which a larger transformation chain instance that is assigned to a first endpoint interface securely interfaces with a portion transformation chain instance that is assigned to a second endpoint interface via a proxy service.

FIG. 16 illustrates an architecture 1600 in which the larger transformation chain instance 1601A that is assigned to a first endpoint interface 1621A securely interfaces with apportion transformation chain instance 1601B that is assigned to a second endpoint interface 1621B via a proxy service 1610.

The larger transformation chain instance 1601A is similar to the transformation chain 1300A of FIG. 13A, except that the first endpoint interface entity 1621A may access only a portion of the endpoints of the node 1305 (now referred to as node 1305A since it now has more limited interfacing capability with the first endpoint interface entity 1621A) and node 1306 (now referred to as node 1306A since it now has more limited interface capability with the first endpoint interface entity 1621A). The ability of the first endpoint interface entity 1621A to interface with the larger transformation chain instance 1601A is represented by bi-directional arrow 1622A.

The portion transformation chain instance 1601B is similar to the portion transformation chain 1300B of FIG. 13B, except that (similar to the case of FIG. 15C) the second endpoint interface entity 1621B may access only a portion of the endpoints of the node 1305 (now referred to as node 1305B since it now has more limited interfacing capability with the second endpoint interface entity 1621B) and node 1306 (now referred to as node 1306B since it now has more limited interface capability with the second endpoint interface entity 1621B). The ability of the second endpoint interface entity 1621B to interface with the portion transformation chain instance 1601B is represented by bi-directional arrow 1622B.

The proxy service 1610 provides a point of abstraction whereby the second endpoint interface entity 1621B may not see or interact with the nodes 1301 through 1304 of the larger transformation chain instance 1601A, nor may the second endpoint interface entity 1621B interface with any of the endpoints of the nodes 1305 and 1306 that are assigned to the first endpoint interface entity 1621A. As an example, the proxy service 1610 may be established by the delegation module 939 of FIG. 9 at the time that a portion of transformation chain instance is assigned to another endpoint interface instances.

The proxy service 1610 keeps track of which endpoints on node 1305 are assigned to each node 1305A and 1305B, and which endpoints on node 1306 are assigned to each node 1306A and 1306B. When the proxy service 1610 receives input transformations from the larger transformation chain (e.g., node 1301), the proxy service 1610 directs the transformation to each of the nodes 1305A and 1305B as appropriate, depending on which values are affected by the input transformations. Furthermore, when output transformations are provided by the nodes 1305A and 1305B to the node 1301, the proxy service 1610 merges the outputs and provides the merged transformations to the node 1301. For the perspective of the node 1301, it is as though the node 1301 is interacting with node 1305, just as the node 1301 did prior to application splitting. Accordingly, performance and function are preserved, while enabling secure application splitting, by maintaining appropriate information separation between the first and second endpoint interface entities 1621A and 1621B. Such merging of output transformations and splitting of input transformations are performed by component 1611 of the proxy service 1610.

The proxy service 1610 may also include a recording module 1620 that evaluates inputs and outputs made to endpoints in each of the nodes 1305A, 1305B, 1306A and 1306B, and records such inputs and outputs. The recording module 1612 also may record the resulting transformations made between nodes. Such recordings are made into a store 1613. A replay module 1613 allows the actions to be replayed. That may be particular useful if the portion transformation chain is assigned to another (i.e., a third) endpoint interface entity later on and a user of that third endpoint interface entity wants to see what was done. That third endpoint interface may come up to speed with what happened during the tenure of the second endpoint interface entity with the portion transformation chain. Another reason to replay might be to check, and approve, commit, or ratify some action. For instance, imagine an order editing scenario where a number of users are seeking to postpone or move back some deliveries. A first user might ask a second user to help with this. However, the first user does not want the second user to edit the order in a way that causes permanent side effects (e.g., some shipping slot gets released and some now slot gets booked due to a service call). The first user might want to replay what the second user did, and if the first user like was she sees, then accept and commit the actions taken. Here, the replay mechanism additionally simulates the side effecting service calls for the second users. Then, on replay, the first user may cause those service calls to be bound to the actual services. The proxy service 1610 further ensures that the limited credentials of the second endpoint interface entity are enforced. For instance, endpoints on the nodes 1305B and 1306B may not receive proprietary data owned by the first endpoint interface entity from a service, and likewise may not change such proprietary data, at least not without the consent of the first endpoint interface entity.

The splitting of transformation chain instances as described herein allows for a wide variety of scenarios. For instance, by only allowing output endpoints to be cloned in the portion transformation chain provided to the second endpoint interface entity, and retaining input and output endpoints with the first endpoint interface entity, the second endpoint interface entity may have a shared view on what the first endpoint interface entity is doing. Of course, the first endpoint interface entity may restrict which output endpoints are provided in the portion transformation chain, and thus such view sharing can even be restricted. Furthermore, collaborative and co-use scenarios are enabled by dividing input endpoints between the first and second endpoint interface entities. Several instances and versions of a portion transformation chain may be split off of the main transformation chain to allow such scenarios across more than two endpoint interface entities. Each split may have an associated proxy service that maintains proper information separation and functioning of the transformation chain.

Figure 17A:
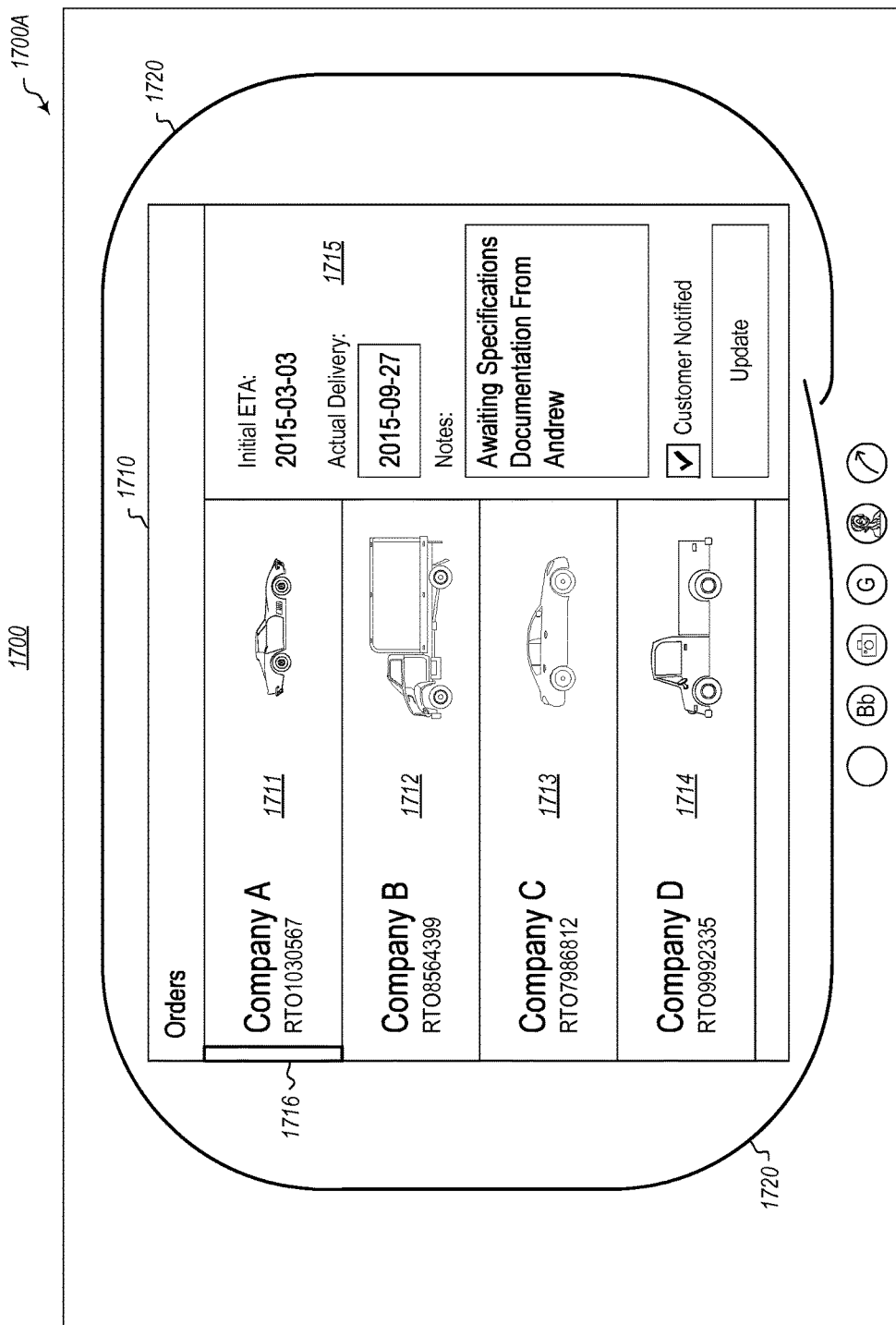
Figure 17C:
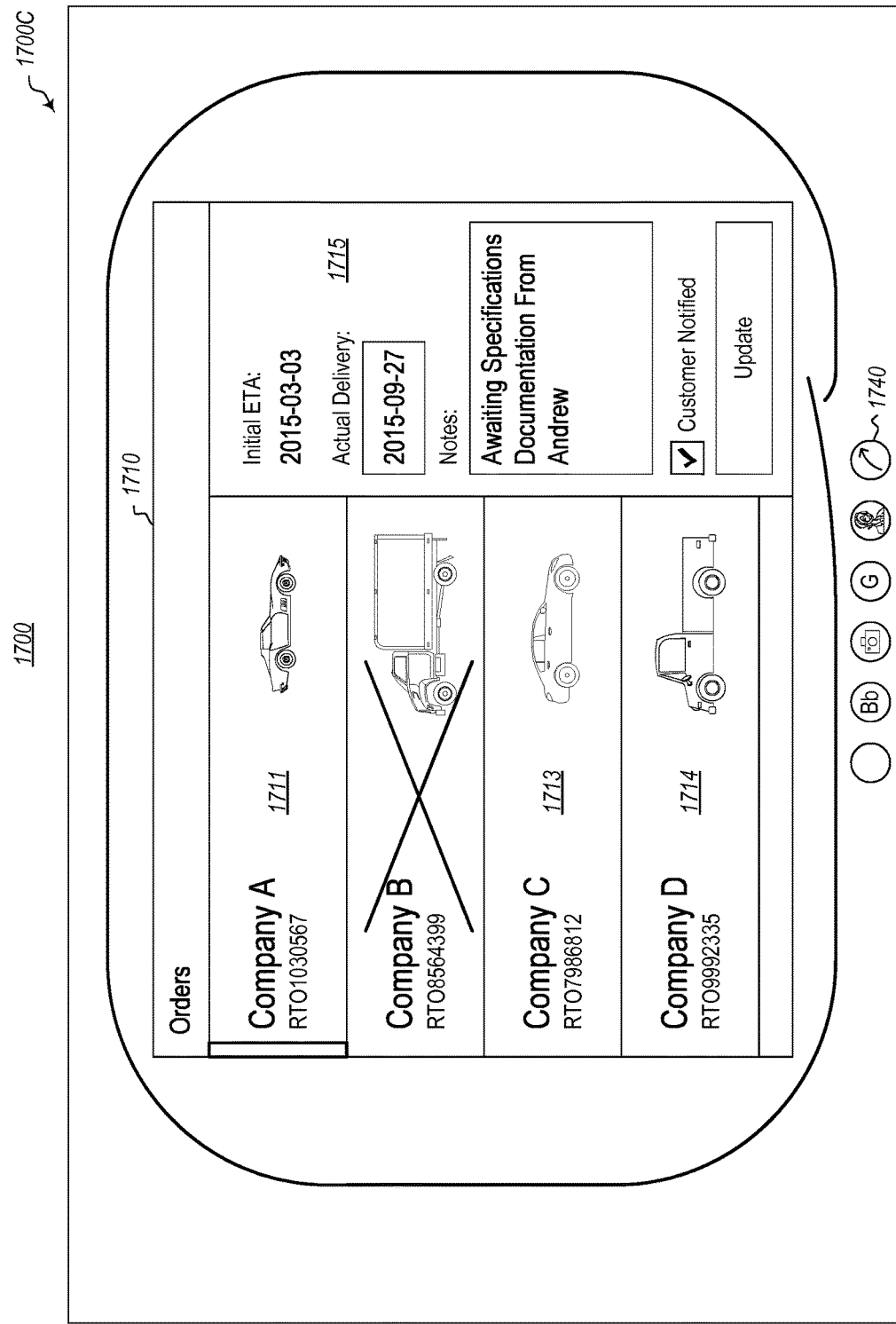

FIGS. 17A through 17C illustrate a specific example of the progress of a user interface 1700 through respective states 1700A through 1700C respectively, and shows how application splitting, delegation, and redaction can occur in one of an infinite variety of scenarios enabled by the broader principles described herein. The user interface state 1700A shows an object 1710 being displayed. The object is an "orders object" and represents only a portion of the total user interface that the underlying application (e.g., a transformation chain) is able to provide. The order object 1710 includes an enumeration of four order fields 1711 through 1714. Each order field includes a name of the order, a picture of the item ordered, and a purchase order number. The user may interact (and example of an environmental event) with the object

1710 by selecting one of the orders, causing properties of the order to appear in a details field 1715. In FIG. 17A, the field 1711 is selected (as represented by the think vertical bar 1716), representing that the details field 1715 includes details about that order. In this example, the order object may correspond to a node in a transformation chain, with visualizations of the order object being output endpoints of that node, and points of input capability being input endpoints of that node.

Now suppose that the user provides a selection user interaction with respect to the user interface 1700, or more specifically provides a selection user interaction with respect to the orders object 1710. Such selection user interaction might include a gesture. For instance, in the state 1700A, the user has circled (with gesture 1720) the orders object 1710. This results in selection of the orders object.

In FIG. 17B, a subsequent state 1700B is shown in which the user has provided a redaction user interaction with respect to the user interface, or more specifically with respect to a subportion of the selected portion. In this example, the user has redacted field 1712, by entering a cross-out gesture with respect to the user interface corresponding to that subportion (i.e., by crossing-out field 1712).

In FIG. 17C, a subsequent state 1700C is shown in which the user has selected a target for sharing the selecting portion (minus the redacted subportion), and has initiated sharing with that target portion. In particular, the user has interacted with element 1740, causing sharing to occur of the order object 1710 with the field 1712 redacted. Such is an example of one of an enumerable variety of sharing that may be accomplished using the principles described herein.

Figure 18:
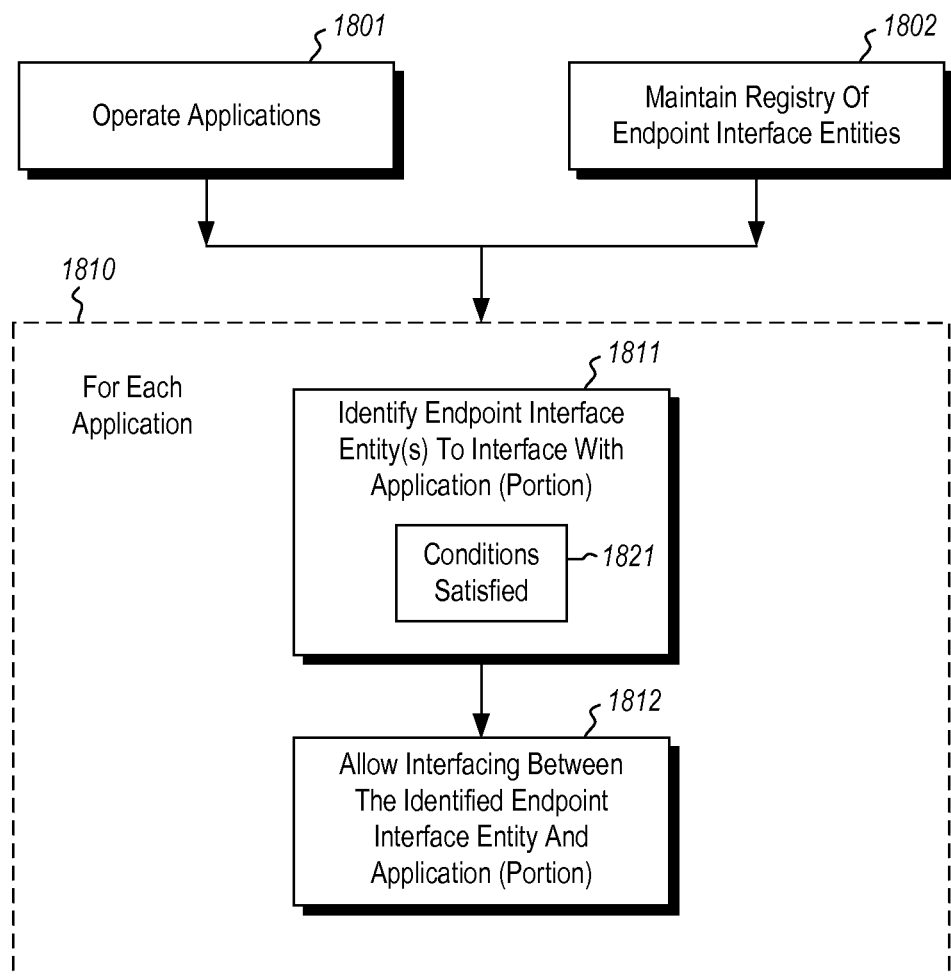
FIG. 18 illustrates a flowchart of a method for sharing an application in response to detecting one or more events at a first endpoint interface entity.

FIG. 18 illustrates a flowchart of a method 1800 for sharing an application in response to user input or other environmental event(s) at a first endpoint interface entity. The method is performed in the context of there being multiple applications operating (act 1801). For instance, in FIG. 9, there are multiple applications in the form of transformation chains operating within the universal canvas 910. Furthermore, a registry of multiple endpoint interface entities is kept (act 1802). In FIG. 9, for example, this registry may be maintained by the endpoint interface entity registry module 935. Recall that an endpoint interface entity may be a hardware entity and perhaps include associated user criteria defining a user status with respect to that hardware entity. Perhaps a single user may satisfy the user criteria with respect to multiple of the registered endpoint interface entities For each of the applications, the content of box 1810 is performed. Specifically, at least one endpoint interface entity selected from the endpoint interface registry is identified (act 1811) as to interface with the application (or a portion thereof). This selection may include determining that the identified endpoint interface entity is credentialed to interface (or correspond) with the application (or the portion thereof). As part of this identification, it is determined that the environmental event(s) (if any) are satisfied with respect to the endpoint interface entity (act 1821). For instance, in FIG. 9, this identification may be made by the endpoint matching module 937.

The identified endpoint interface entity is then allowed (act 1812) to interface with the application (or the portion thereof). In other words, within the scope of the application (or the portion thereof), the identified endpoint interface entity is permitted to interface with the corresponding application endpoints within that scope. In the case of a split application, in which different endpoint interface entities are to interface with different portions of the application, the delegation module 939 operates as described above.

In the event that there are multiple endpoint interface entities that are available for a given application, the identification of an appropriate endpoint interface entity (act 1811) might also include determining that 1) an output endpoint for rendering at the hardware entity of the identified endpoint interface entity is efficiently perceivable to at least one (a plurality of) user that satisfies(y) the user criteria of the identified endpoint interface entity, or has some specific characteristic helpful or required to complete a portion of a user's task intent or delivery the appropriate action in response to some implicit event in the environment, and 2) does not conflict with at least one other output endpoint rendered at the hardware entity so as to adversely affect perception of at least one user that satisfies the user criteria. Similarly, the identification of an appropriate endpoint interface entity (act 1811) might also include determining that 1) an input endpoint for inputting at the hardware entity of the identified endpoint interface entity is capable of receiving input from at least one (a plurality of) active endpoint interface entities, or has some specific characteristic helpful or required to complete a portion of a user's task intent or delivery the appropriate action in response to some implicit event in the environment; and 2) an input endpoint for inputting at the hardware entity of the identified endpoint interface entity does not conflict with at least one other input endpoint rendered at the hardware entity so as to adversely affect ability to input of at least one user that interfaces with another endpoint interface entity. Through these determinations with respect to all input and output endpoints of the application, an appropriate distribution of interfacing may be determined.

Figure 19:
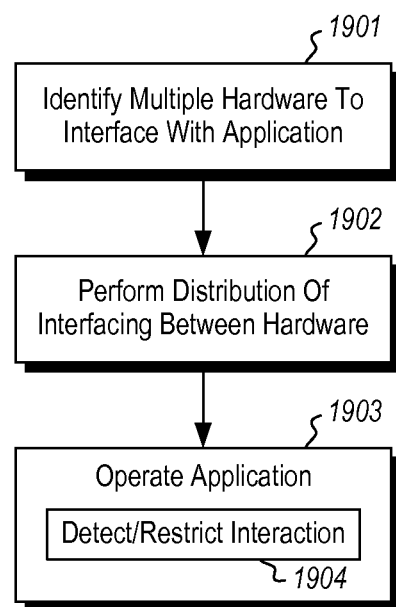
FIG. 19 illustrates a flowchart of a method for distributed interfacing with an application across a plurality of hardware entities.

FIG. 19 illustrates a flowchart of a method 1900 for distributed interfacing with an application across a plurality of hardware entities. The method 1900 is an example of the act 1812 of FIG. 18 in the context of there being multiple endpoint interface entities that interface with a particular application. The method includes identifying that multiple hardware entities are available to interface with an application having multiple endpoints (act 1901). The method 1900 then includes performing of distribution of assignments (act 1902) of the hardware entities to interact with the endpoints. This assignment includes assigning which application endpoints each hardware entity may interface with. This assignment may be rules-based.

When the application is thereafter operated (act 1903), various interaction is performed at the endpoints. The presentation module 938 tailors the interaction (act 1904) of the hardware entities with the endpoints by, for each endpoint, restricting the interaction capability of the endpoint perhaps according to the input and output hardware capabilities of the hardware entities. For instance, if an object is to be displayed on a large display that has no touch input, a prompt to "touch here" to perform some function may be removed, whereas if the object is being displayed on a touch screen, that prompt may be present. If information is being displayed via a particular output endpoint on a high fidelity display, perhaps more detail may be displayed on the high fidelity display as compared to, for instance, a watch having a smaller display. Thus, the interaction capability of an endpoint may be restricted. In other words, the input to an endpoint may be restricted according to capabilities of the hardware entity, and output from an endpoint may be restricted according to capabilities of the hardware entity.

Furthermore, restrictions may be made depending on detection of environmental event(s) associated with a hardware entity. For instance, if most users are further away from the display, less detail might be displayed in favor of enlargement of visualizations. The rules for determining how to restrict an endpoint may be based on at least in part on 1) the interaction capabilities of the hardware entities, 2) anticipated interference in the capabilities of the hardware entities 3) a position of one or more users with respect to at least one or more of the hardware entities; and 4) a control of one or more users with respect to one or more of the hardware entities.

One benefit of the split application configuration described with respect to FIG. 16 is that data flows and interactions of the portion of the application assigned to a delegee endpoint interface entity are recorded. Thus, data flows to that portion that are synchronous in nature may be converted into asynchronous communications by recording of the same. This allows the recordings to be replayed or transferred to another hardware entity. Thus, the principles described herein allow smooth transitioning of communications from synchronous to asynchronous.

Figure 20:
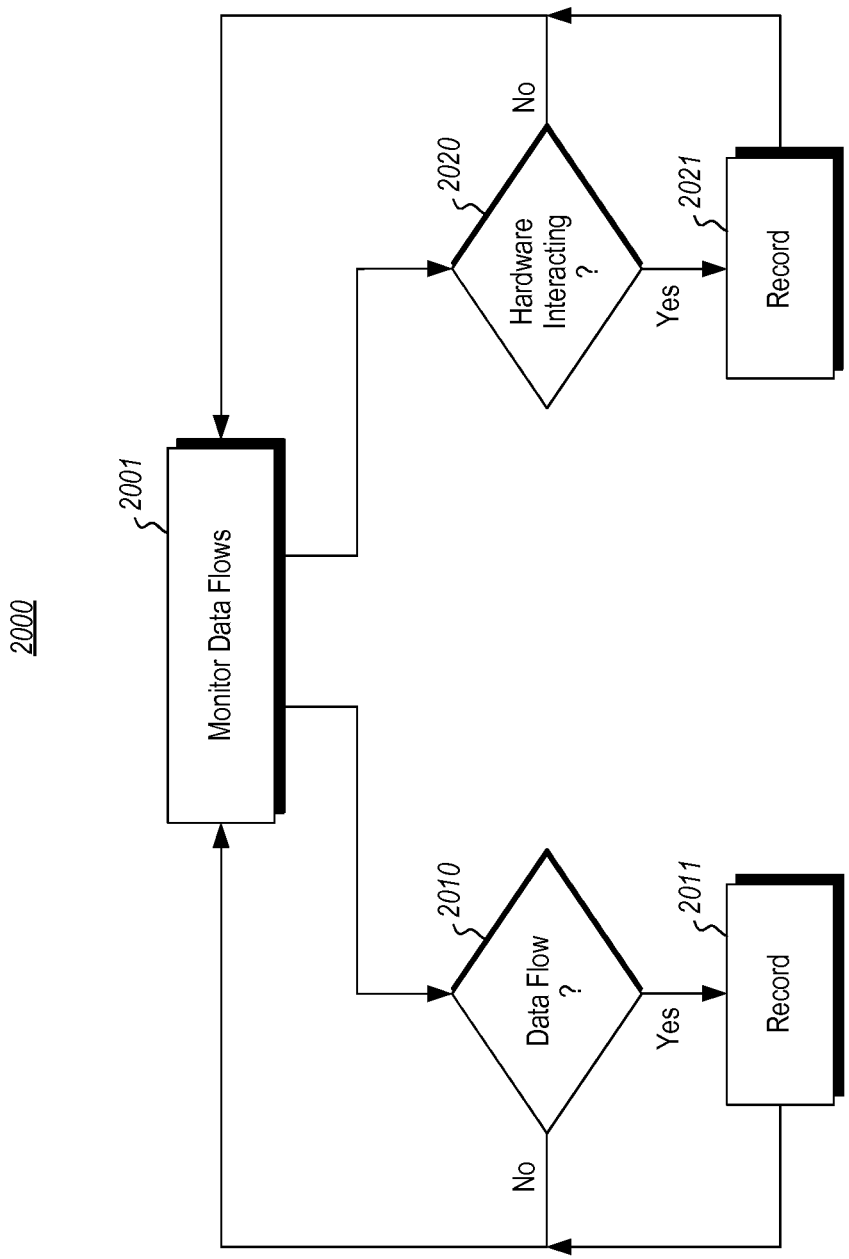
FIG. 20 illustrates a flowchart of a method for a first portion of an application to communicate with a second portion of an application in a manner that prepares for transitioning from synchronous to asynchronous.

FIG. 20 illustrates a flowchart of a method 2000 for a first portion of an application to communicate with a second portion of an application in a manner that prepares for such transitioning from synchronous to asynchronous. In the described context, the applications may be transformation chains. Throughout the method, data flow is monitored between the portions of the application (act 2001). This monitoring may also include monitoring of data flows amongst nodes within the second portion, and/or interaction of the second endpoint interface entity with endpoint nodes of the second application portion. For instance, in the context of FIG. 16, the recording module 1612 may perform the monitoring in the context of the first portion of the application being the portion 1601A, and the second portion of the application being the portion 1601B.

If, during this monitoring (act 2001), data flow is detected ("Yes" in decision block 2010), the data flow is recorded (act 2011), and the method returns to continue monitoring (act 2001). If, during this monitoring (act 2001), interactions between the second hardware entity and the second portion of the application are detected ("Yes" in decision block 2020), the interactions are recorded (act 2021), and the method returns to continue monitoring (act 2001). At times when there are no data flows detected ("No" in decision block 2010) and no interactions detected ("No" in decision block 2020), the monitoring simply continues as long as the application is split.

Figure 21:
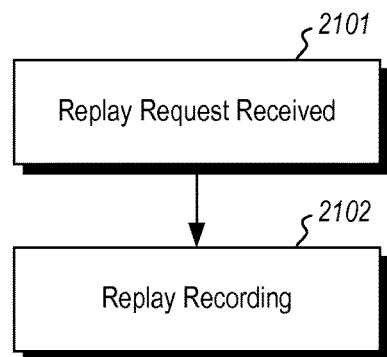
FIG. 21 illustrates a flowchart of a method for transitioning to asynchronous communications in the context of synchronous communications being recorded.

The recordings are made in a manner that they can be replayed (e.g., by the second hardware entity that is assigned to the second portion of the application) or reassigned (e.g., from the second hardware entity to a third hardware entity). FIG. 21 illustrates a flowchart of a method 2100 for transitioning to asynchronous communications in the context of synchronous communications being recorded. First, a request is received (or appropriate environment event(s) are detected suggesting that it would be helpful) to replay the recorded communications (act 2101), after which the requested replay is performed (act 2102). For instance, if the second endpoint interface entity was not readily prepared for the synchronous communication from the first endpoint interface entity, the second endpoint interface entity may simply replay the communications to come up to speed.

Figure 22:
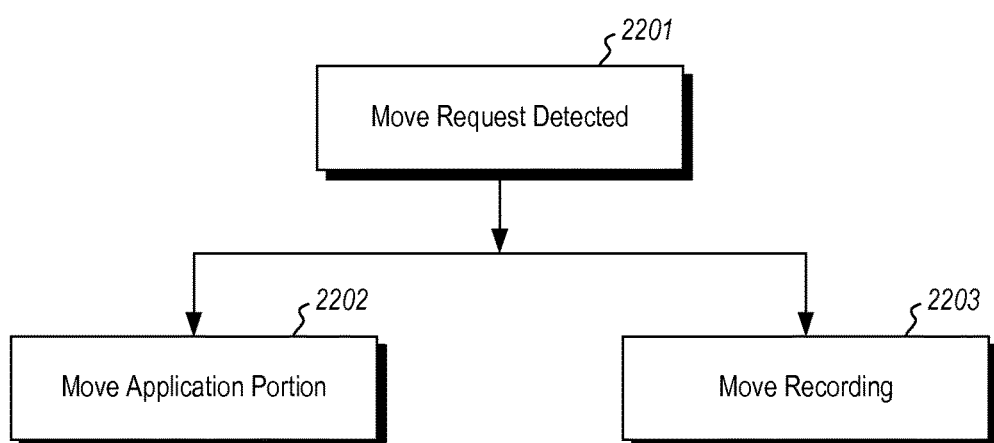
FIG. 22 illustrates a flowchart of a method for reassigning the split portion of an application to another endpoint interface entity.
Figure 23:
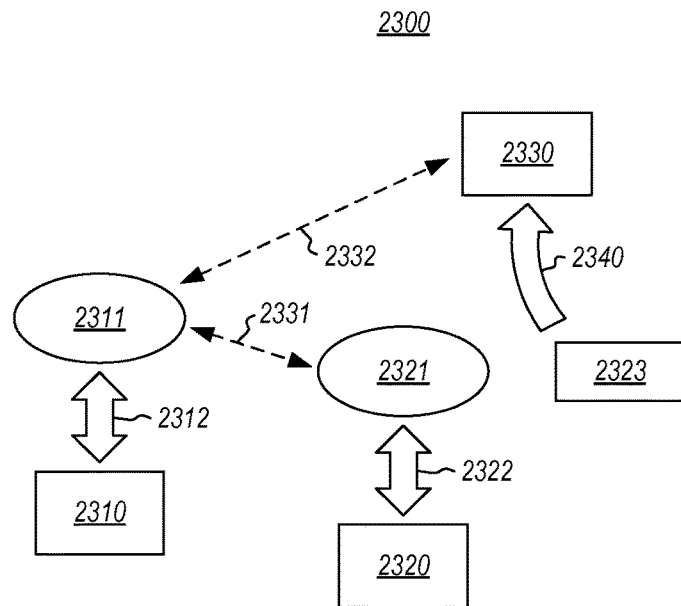
FIG. 23 illustrates an environment in which the reassignment of FIG. 22 may be made.

In another scenario, the first endpoint interface entity may reassign the split portion of the application from the second endpoint interface entity to a third endpoint interface entity, without the first endpoint interface entity having to redo the communication, and being able to take advantage of what input the second endpoint interface entity was able to provide. FIG. 22 illustrates a flowchart of a method 2200 for reassigning the split portion of an application to another endpoint interface entity. Specifically, a request is detected (or appropriate environment event(s) are detected suggesting that it would be helpful) to move the split portion of the application (act 2201). For instance, FIG. 23 illustrates an environment 2300 in which such a move request may be made. The first portion 2311 of an application had been communicating (as represented by arrow 2331) with a second portion 2321 of the application. A first hardware entity 2310 is interacting (as represented by arrow 2312) with endpoints of the first portion 2311 of the application. A second hardware entity 2320 at least has the capability of interacting (as represented by arrow 2322) with endpoints of the second portion 2321 of the application. During these communications, the recorded information 2323 (i.e., the recorded data flow represented by arrow 2331, and the recorded interactions represented by arrow 2322) is also maintained.

In response to the move request (act 2201), a third endpoint interface entity 2330 is permitted to interact with the second portion 2321 of the application (act 2202), and the recorded information 2323 is provided to the third endpoint interface entity 2330 (act 2203). This transfer of control and recorded information regarding the second portion of the application from the second endpoint interface entity to the third endpoint interface entity is represented by arrow 2340 in FIG. 23. Thereafter, the first portion of the application may communicate (as represented by arrow 2332) with the second portion of the application that has now been reassigned to the third endpoint interface entity 2330.

Formatting of displayed information becomes challenging in this environment due to the many degrees of freedom that could affect how information is formatted and laid out. For instance, the application itself may grow and be split, as previously described, and thus the application itself may change dynamically over even a short period of time. This affects the number and nature of the output endpoints that result in visualizations. Furthermore, there may be multiple hardware entities rendering visualizations of an application, each with varying capability to display. In addition, changing environmental conditions may change the availability of a hardware entity to render information. For instance, due to enforcement of user criteria, changing conditions may cause endpoint interface entities to dynamically become available and unavailable.

Figure 24:
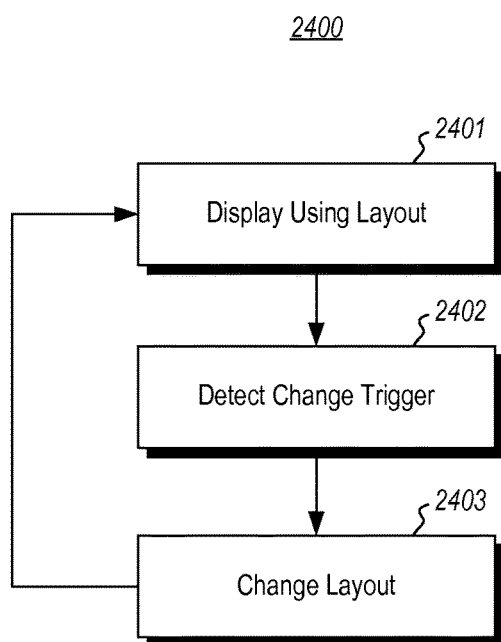
FIG. 24 illustrates a flowchart of a method for facilitating layout on a display that receives output from an application that redefines during use.

FIG. 24 illustrates a flowchart of a method 2400 for facilitating layout on a display that receives output from an application that redefines during use. The method 2400 may be performed with respect to each available display that renders information from output endpoints of the application. First, a layout of information is presented (act 2401). Then, however, due to any one of the degrees of freedom previously mentioned, a trigger is detected (act 2402) for changing the layout. In response, the layout for that display is altered (act 2403), and the altered layout is presented (act 2401). The process is repeated with each detected trigger, thereby changing the layout. The changed layout of information may represent a change in the information that is presented. For instance, perhaps more or less detail is displayed, or perhaps subject matter not previously displayed is brought into the display, or subject matter is moved away from the display. Computations may also be performed on the visualizations. For instance, information might be merged in a display.

Examples of triggers that might change the layout include, but are not limited to, 1) the first application changes to a second application due to growth or splitting of the application, 2) a change in allocation of output between multiple displays, 3) a change in users of the display, 4) a change in position of one or more users with respect to the display, 5) a change in control of one or more users with respect to the display, 6) a change in authorization of one or more users with respect to the display or the information displayed.

Rather than simply applying to layout, the method 2400 of FIG. 24 could be applied to all forms of output and all forms of input. For instance, as for output, some parts of the output may be spoken. Some endpoint interface entities may light up or vibrate, or more to convey information (e.g., a screen swivels just a tad to suggest urgency, or an accompanying drone maneuvers in a certain noticeable way). Different parts of the output may be sequenced, rather than juxtaposed, perhaps by creating an animation on the same or multiple endpoint interface entities. For input, as an example, a particular input menu may be lit up on one display, rather than another. One microphone may be switched on, rather than another (with a light on the microphone indicating which microphone is active). Of course, these are just examples.

Accordingly, a robust and organic application model has been described on the basis of transformation chains. The concept of transformation chains was first described with respect to FIGS. 1 through 8. An example supporting architecture was then described with respect to FIG. 9. Thereafter, various operations of the transformation chains (including joining, splitting, delegation, endpoint restriction, formatting, and so forth) were described with respect to FIGS. 10 through 24. Of course, all of these functions are supported by computing technology. Accordingly, a general computing system will now be described for the sake of completeness with respect to FIG. 25.

Computing System Description

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 25:
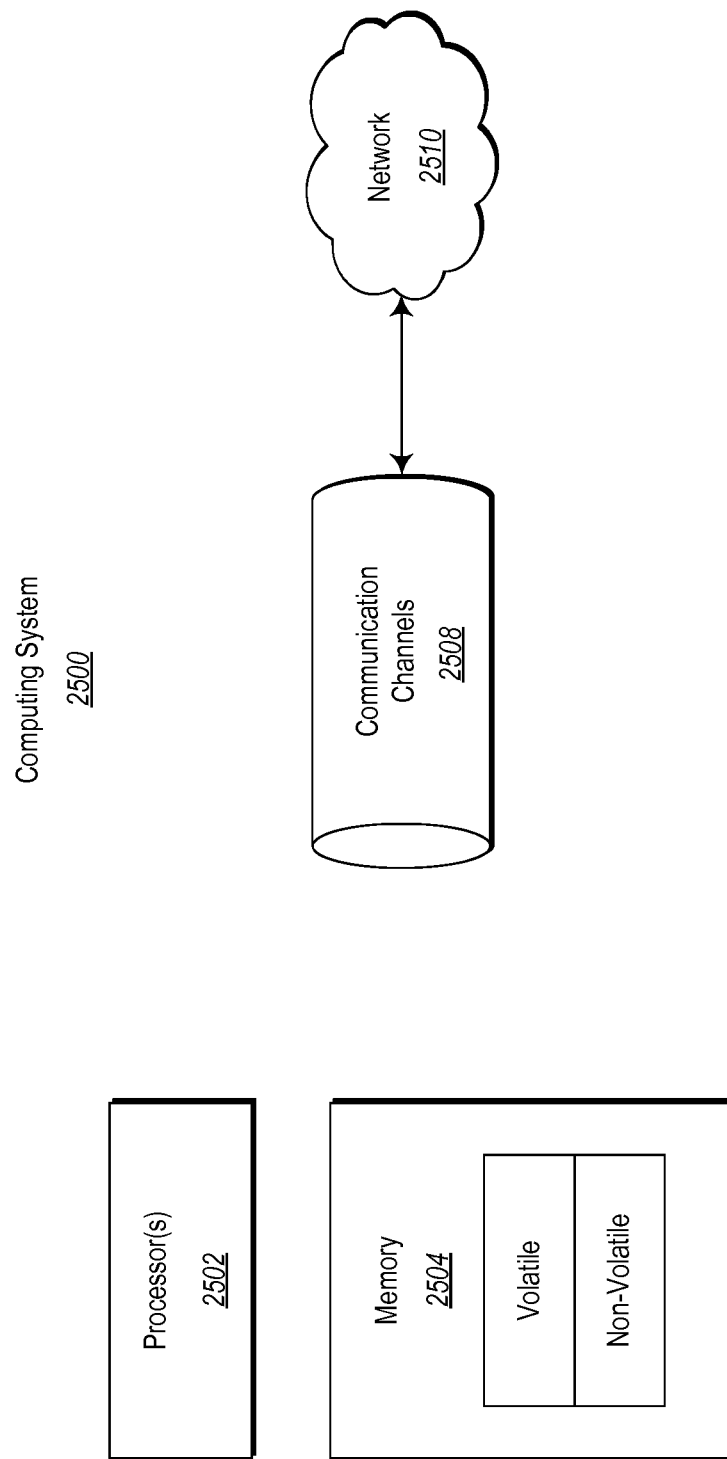
FIG. 25 abstractly illustrates a computing system in which some embodiments described herein may be employed.

As illustrated in FIG. 25, in its most basic configuration, a computing system 2500 typically includes at least one hardware processing unit 2502 and memory 2504. The memory 2504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 2504 of the computing system 2500. Computing system 2500 may also contain communication channels 2508 that allow the computing system 2500 to communicate with other message processors over, for example, network 2510.

The computing system 2500 also may potentially include output rendering components, such as displays, speakers, lights, actuators, or the like. The computing system 2500 may also include input components, such as a keyboard, pointer device (such as a mouse or tracking pad), voice recognition devices, and possibly also physical sensors (e.g., thermometers, global positioning systems, light detectors, compasses, accelerometers, and so forth).

Embodiments described herein may comprise or utilize a special purpose or general purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Accordingly, the principles described herein provide a new application paradigm in which compound and customized applications may be built dynamically as the need arises by the users themselves based on input from the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware media having thereon computer-executable instructions that are structured such that, when executed by one or more processors of a computing system, cause the computing system to perform a method for creating a transformation chain for performing distributed interfacing with an application across a plurality of endpoint interface entities, the method comprising:
   an act of receiving an environmental input at a particular endpoint interface entity;
   in response to receiving the environmental input, performing at least the following:
       an act of detecting that an initiating set of environmental criteria has been met such that the particular endpoint interface entity is available for the application;
   an act of identifying, from an endpoint registry containing all possible endpoint interface entities, a first plurality of endpoint interface entities available to interface with the application, each of the first plurality of endpoint interface entities having a plurality of endpoints with which each can interface with the application, and wherein the available endpoint interface entities are endpoint interface entities that are presently active and available based on the application;
   an act of performing distribution of the assignment of the first plurality of endpoint interface entities to interact with the plurality of endpoints by performing for each of at least some of the plurality of hardware entities at least the following:
       an act of determining a subset of endpoints with which the corresponding endpoint interface entity is to interface; and
       an act of operating the application to thereby detect interaction of at least some of the first plurality of endpoint interface entities with the application via at least some of the plurality of endpoints, including detecting at least a first input to produce a first output;
   in response to at least producing the first output, an act of identifying a second plurality of endpoint interface entities available to interface with the application, at least one of the second plurality of endpoint interface entities having at least one endpoint for which the first output is valid as an input; and
   an act of directing the first output to the at least one endpoint of the second plurality of endpoint interface entities in the form of a second input; and
   an act of at least temporarily storing a transformation chain class representing at least the particular endpoint interface entity, the endpoint interface entity that produced the first output, and the endpoint interface entity that received the second input.

2. The computer program product in accordance with claim 1, wherein the plurality of endpoints comprises a plurality of input endpoints.

3. The computer program product in accordance with claim 2, the plurality of endpoints also comprising a plurality of output endpoints.

4. The computer program product in accordance with claim 1, the plurality of endpoints comprising a plurality of output endpoints.

5. The computer program product in accordance with claim 1, further comprising:
   an act of tailoring interaction of the endpoint interface entities with the plurality of endpoints by restricting the interaction capability of the endpoint for each of at least some of the endpoints with which the at least some of the plurality of endpoint interface entities interacted with.

6. The computer program product in accordance with claim 1, the act performing distribution of the assignment of endpoint interface entities to interact with the plurality of endpoints being based at least in part on the interaction capabilities of the plurality of endpoint interface entities.

7. The computer program product in accordance with claim 1, the act performing distribution of the assignment of endpoint interface entities to interact with the plurality of endpoints being based at least in part on anticipated interference in the capabilities of the plurality of endpoint interface entities.

8. The computer program product in accordance with claim 1, the act performing distribution of the assignment of endpoint interface entities to interact with the plurality of endpoints being based at least in part on a position of one or more users with respect to at least one endpoint interface entity of the plurality of hardware entities.

9. The computer program product in accordance with claim 1, the act performing distribution of the assignment of hardware entities to interact with the plurality of endpoint interface being based at least in part on a control of one or more users with respect to at least one hardware entity of the plurality of endpoint interface entities.

10. A method for a presentation module to instantiate a transformation chain to perform distributed interfacing with an application across a plurality of endpoint interface entities, the method comprising:
receiving an environmental input at a particular endpoint interface entity;
in response to receiving the environmental input, performing at least the following:
detecting that an initiating set of environmental criteria has been met the causing the particular endpoint interface entity to be available for the application;
identifying, from an endpoint registry containing all possible endpoint interface entities, a first plurality of endpoint interface entities available to interface with the environmental input as part of the application, each of the first plurality of endpoint interface entities having a plurality of endpoints with which they can interface with the application, and wherein the available endpoint interface entities are endpoint interface entities that are presently active and available based on the application;
performing distribution of the assignment of the first plurality of endpoint interface entities to interact with the plurality of endpoints by, for each of at least some of the plurality of hardware entities, determining a subset of endpoints with which the corresponding endpoint interface entities is to interface;
operating the application to thereby detect interaction of at least some of the first plurality of hardware entities with the application via at least some of the plurality of endpoints including detecting at least a first input to produce a first output;
in response to at least producing the first output, identifying a second plurality of endpoint interface entities available to interface with the application, at least one of the second plurality of endpoint interface entities having at least one endpoint for which the first output is valid as an input; and
an act of directing the first output to the at least one endpoint of the second plurality of endpoint interface entities in the form of a second input; and
at least temporarily storing a transformation chain class representing at least the particular endpoint interface entity, the endpoint interface entity that produced the first output, and the endpoint interface entity that received the second input.

11. The method in accordance with claim 10, further comprising: after operating the application, performing redistribution of the assignment of endpoint interface entities to interact with the plurality of endpoints in response to a change in conditions.

12. The method in accordance with claim 11, wherein performing redistribution of the assignment of endpoint interface entities to interact with the plurality of endpoints being based at least in part on the interaction capabilities of the plurality of endpoint interface entities.

13. The method in accordance with claim 11, wherein performing redistribution of the assignment of endpoint interface entities to interact with the plurality of endpoints being based at least in part on a change in anticipated interference in the capabilities of the plurality of endpoint interface entities.

14. The method in accordance with claim 11, wherein performing redistribution of the assignment of endpoint interface entities to interact with the plurality of endpoints being based at least in part on change in a position of one or more users with respect to at least one endpoint interface entity of the plurality of hardware entities.

15. The method in accordance with claim 11, wherein performing redistribution of the assignment of endpoint interface entities to interact with the plurality of endpoints being based at least in part on change in a control of one or more users with respect to at least one endpoint interface entity of the plurality of hardware entities.

16. The method in accordance with claim 11, wherein performing redistribution of the assignment of endpoint interface entities to interact with the plurality of endpoints being based at least in part on change in the application so as to change the plurality of endpoints.

17. A system comprising:
one or more processors; and
one or more computer-readable media having thereon computer-executable instructions that are structured such that, when executed by one or more processors of a computing system, cause the computing system to instantiate a transformation chain to perform a method for distributed interfacing with an application across a plurality of endpoint interface entities, the method comprising:
an act of receiving an environmental input at a particular endpoint interface entity;
in response to receiving the environmental input, performing at least the following:
an act of detecting that an initiating set of environmental criteria has been met such that the particular endpoint interface entity is available for the application;
an act of identifying, from an endpoint registry containing all possible endpoint interface entities, a first plurality of endpoint interface entities available to interface with the application, each of the first plurality of endpoint interface entities having a plurality of endpoints with which each can interface with the application, and wherein the available endpoint interface entities are endpoint interface entities that are presently active and available based on the application;
an act of performing distribution of the assignment of the first plurality of endpoint interface entities to interact with the plurality of endpoints by, for each of at least some of the plurality of endpoint interface entities, performing an act of determining a subset of endpoints with which the corresponding endpoint interface entity is to interface;
an act of operating the application to thereby detect interaction of at least some of the first plurality of endpoint interface entities with the application via at least some of the plurality of endpoints including detecting at least a first input to produce a first output;

in response to at least producing the first output, an act of identifying a second plurality of endpoint interface entities available to interface with the application, at least one of the second plurality of endpoint interface entities having at least one endpoint for which the first output is valid as an input; and an act of directing the first output to the at least one endpoint of the second plurality of endpoint interface entities in the form of a second input; and an act of at least temporarily storing a transformation chain class representing at least the particular endpoint interface entity, the endpoint interface entity that produced the first output, and the endpoint interface entity that received the second input.

18. The system in accordance with claim 17, the method further comprising:

after the act of operating, an act of performing redistribution of the assignment of endpoint interface entities to interact with the plurality of endpoints in response to a change in conditions.

* * * * *